United States Patent [19]
Omiya et al.

[11] 3,849,796
[45] Nov. 19, 1974

[54] ROTARY HEAD MAGNETIC RECORDING AND REPRODUCING APPARATUS

[75] Inventors: Shoji Omiya, Shijonawate; Yoshiaki Hayashi, Takatsuki; Akio Kuki, Moriguchi, all of Japan

[73] Assignee: Matsushita Electric Industrial Co., Ltd., Kadoma-shi, Osaka, Japan

[22] Filed: Feb. 20, 1973

[21] Appl. No.: 333,481

[30] Foreign Application Priority Data

Feb. 21, 1972 Japan ................................ 47-18172

[52] U.S. Cl. .................... 360/85, 242/197, 360/102
[51] Int. Cl. ...... G11b 5/52, G11b 5/60, G11b 23/04
[58] Field of Search .............. 179/100.2 Z, 100.2 T; 242/197; 226/96; 274/11 F, 11 B, 4 B; 36/85, 102

[56] References Cited

UNITED STATES PATENTS

| | | | |
|---|---|---|---|
| 3,150,840 | 9/1964 | Briskin et al. | 242/197 |
| 3,387,797 | 6/1968 | Rahmel et al. | 242/197 |
| 3,598,926 | 8/1971 | Umeda | 179/100.2 T |
| 3,604,657 | 9/1971 | Igarashi | 242/197 |
| 3,662,972 | 5/1972 | Egan | 242/197 |
| 3,682,415 | 8/1972 | Ibuchi | 242/197 |
| 3,691,315 | 9/1972 | Ellmore | 179/100.2 T |
| 3,697,679 | 10/1972 | Hathaway | 179/100.2 ZA |

*Primary Examiner*—Alfred H. Eddleman
*Attorney, Agent, or Firm*—Stevens, Davis, Miller & Mosher

[57] ABSTRACT

A rotary head magnetic recording and reproducing apparatus in which a rotating drum having at least one magnetic head mounted about the outer surface thereof is rotated at high speed, and a reel of magnetic tape contained in a cartridge is automatically taken out and wound around the outer surface of the rotating drum for about a single turn, whereby signals are recorded on or reproduced from the magnetic tape by the magnetic head with a layer of air being formed between the rotating drum and the tape by virtue of an air stream caused by the rotating drum rotating at high speed.

6 Claims, 47 Drawing Figures

PATENTED NOV 19 1974 3,849,796

SHEET 04 OF 23

PATENTED NOV 19 1974

3,849,796

SHEET 17 OF 23

ROTARY HEAD MAGNETIC RECORDING AND REPRODUCING APPARATUS

The present invention relates to a memory device of the type which employs cartridges with a reel of magnetic tape contained in each cartridge, thereby making the changing of reels simpler.

Included among the memory devices which have heretofore been used with small electronic computers, inventory controllers, registers and so on, are small fixed magnetic drums and changeable disk cartridges each containing one or several magnetic disks. A disadvantage of the former type memory, i.e., the small fixed magnetic drum is that the magnetic drum is usually unchangeable and therefore the memory capacity cannot be easily increased or decreased. While the latter disk memory has the advantage of providing infinitely large memory capabilities by increasing the number of disk cartridges as much as desired, it also has the following disadvantages. Namely, since the surface of each disk must be coated with a magnetic plating or coating and moreover since, in consideration of the ability of a floating head to follow up and the required spacing between the disks, high mechanical precision must be met with respect to the surface finish and deflection of the disks and the method of supporting the disks and the floating head, etc., and a complicated dust proof structure is required for the disks, the manufacturing cost increases as the number of cartridges is increased. Furthermore, though a thin miniature size cartridge case has been used, the diameter of the cartridge cases is still considerably large and therefore these disk cartridges have not been entirely satisfactory with respect to the ease of handling and conveyance thereof.

It is therefore an object of the present invention to provide a rotary head magnetic recording and reproducing apparatus which employs a magnetic tape as a recording medium and in which the magnetic tape can be easily loaded or removed from the apparatus.

It is another object of the present invention to provide a rotary head magnetic recording and reproducing apparatus which employs a magnetic tape as a recording medium and in which the selection of data tracks can be accomplished easily.

It is still another object of the present invention to provide a rotary head magnetic recording and reproducing apparatus in which a reel of magnetic tape contained in a cartridge is automatically taken and wound around the outer surface of a rotating drum.

It is still another object of the present invention to provide a rotary head magnetic recording and reproducing apparatus which employs magnetic tape cartridges, facilitating the preservation of magnetic tapes.

The random access memory device in accordance with the present invention which employs readily changeable cartridges with a reel of magnetic tape in each cartridge may use as a recording medium any of such kinds of magnetic tapes which have heretofore been used with electronic computers and therefore the apparatus of this invention is very inexpensive. Further, since magnetic tapes are made of a tape whose merit lies in its flexibility, the cartridges in which the tape is contained can be made far smaller than the cartridges for magnetic disks. Moreover, since the magnetic tape may be more readily floated from the head as compared with the disk to effect the magnetic recording without any contact therebetween, the apparatus is easy to operate and its construction is also simple. Furthermore, any desired storage capacity can be obtained by using, for example, a tape of ½ inch, ¾ inch, 1 inch or 2 inches in width. Still further, instead of utilizing the method of electronic switching for multi-heads, random access of the magnetic tape with a single head may be accomplished by sliding the magnetic tape in the axial direction of a rotating drum. The speed at which the a reel of magnetic tape in the tape cartridge may be automatically loaded on the outer surface of the rotating drum is about the same or faster than that at which the disk cartridge may be loaded on the deck.

Prior to describing specific embodiments of the present invention, one form of application in which the memory apparatus according to the present invention has been applied to the inventory control of a super market will be explained. Assume that three kinds of tape cartridges are in use, of which a tape cartridge A contains the data on the stock of several kinds (article numbers) of foodstuffs, a tape cartridge B the data on the stock of clothes and C the data on the stock of household electrical appliances. In this way, when it is desired to check the stock of a certain numbered article of clothes, the tape cartridge B is loaded on the deck of the apparatus and then a key on the keyboard corresponding to the code of this article is depressed, whereby the desired record area is selected and the previously recorded data is read from the tape by the head to indicate the total amount of the article on hand. On the other hand, if another number of the clothes has been sold changing the stock, the tape cartridge B is loaded on the deck of the apparatus and a relevant key on the keyboard is depressed, whereby the desired record area is selected and a new data on the stock is recorded through the head. In this manner, if a large number of tape cartridges are provided for different articles, the inventory control of all kinds of goods may be accomplished. Of course, the memory apparatus according to the present invention may also be used as a memory for CRT display and the like in addition to the inventory controller.

While, in the applications so far described, the apparatus according to the present invention has been used for the most part as a digital memory, the apparatus may be equally utilized as an analog memory apparatus.

Other objects, advantages and features of the present invention will become apparent from considering the following detailed description in conjunction with the accompanying drawings, in which.

Figure 8A:
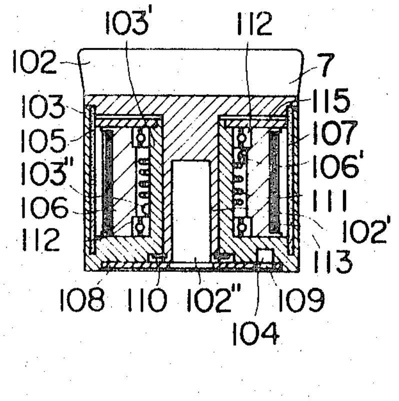
Figure 8B:
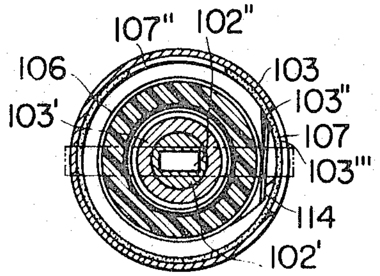
Figure 8C:
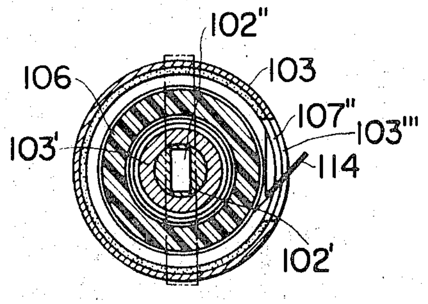
Figure 8D:
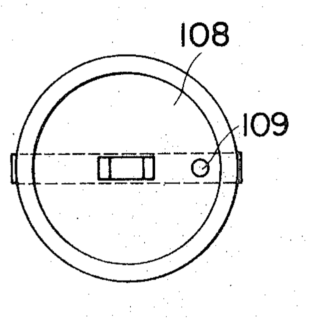
Figure 10:
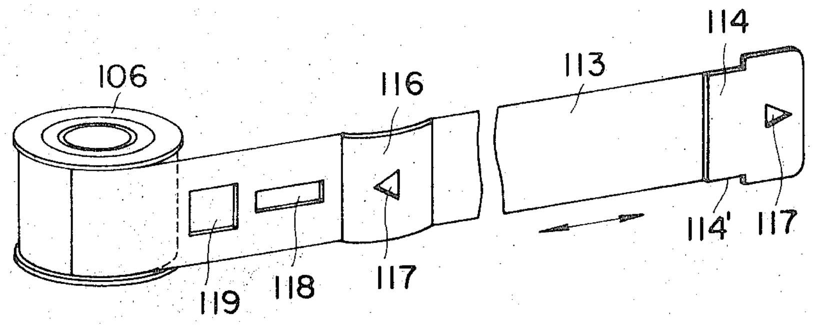
Figures 9A, 9B, 9C:
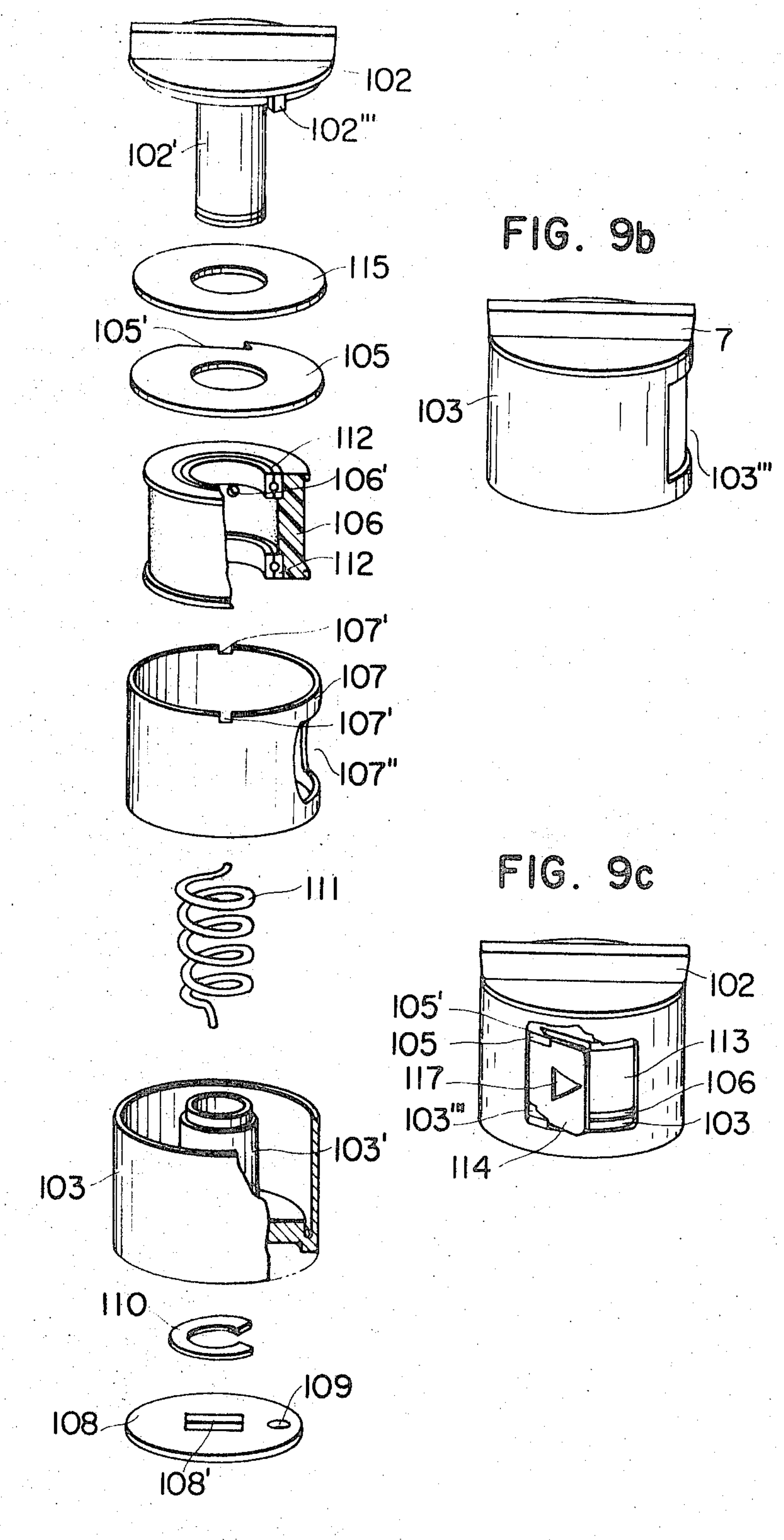
Figures 11A, 11B:
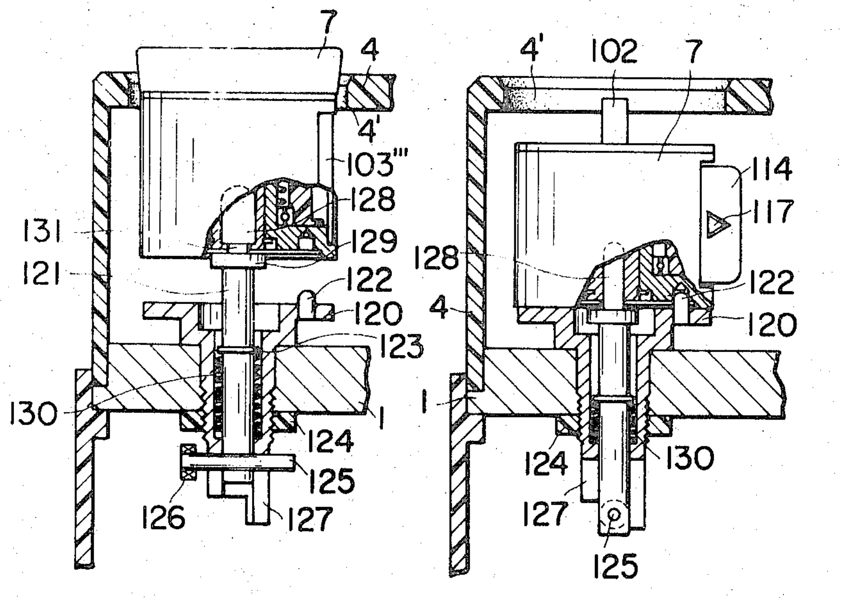
Figure 11C:
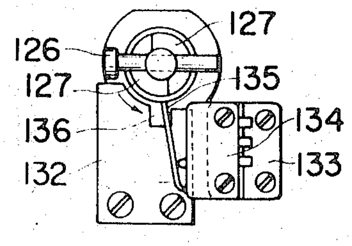
Figure 11D:
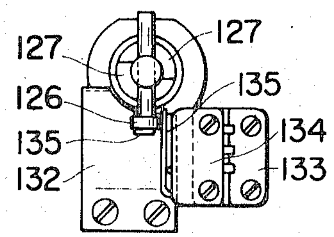
Figure 11E:
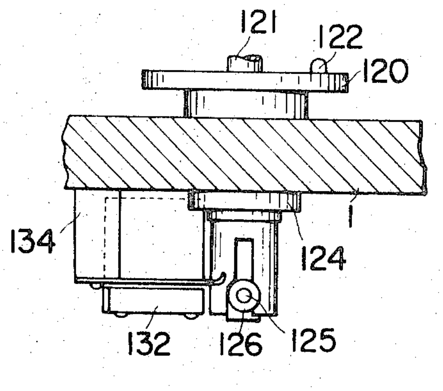
Figure 11F:
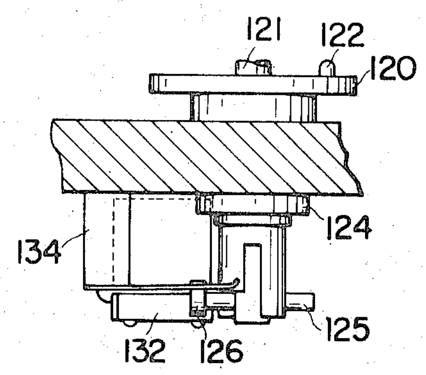
Figures 12, 13:
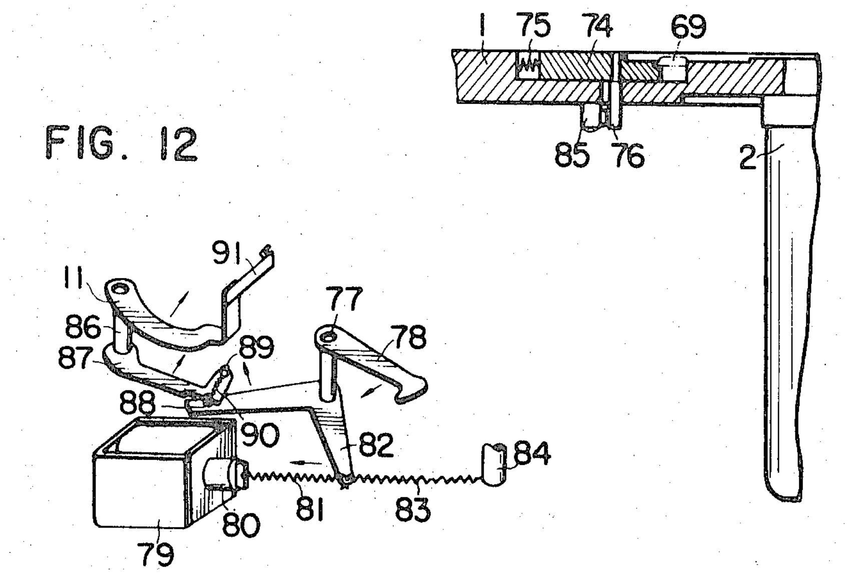
Figure 14A:
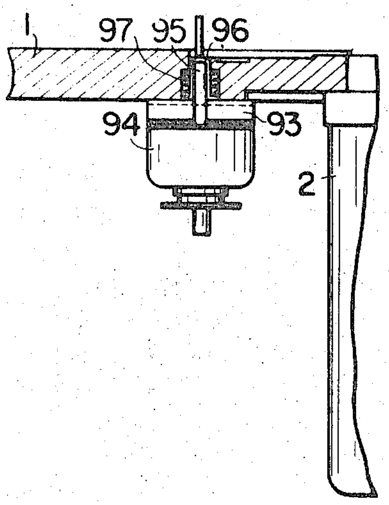
Figure 14B:
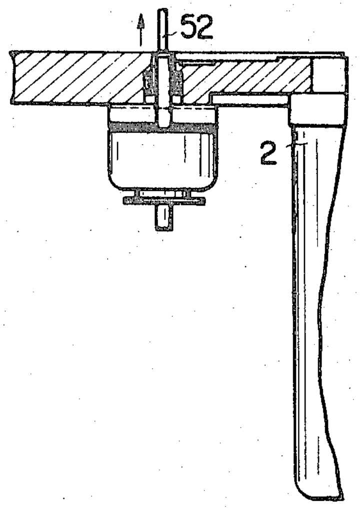
Figure 15A:
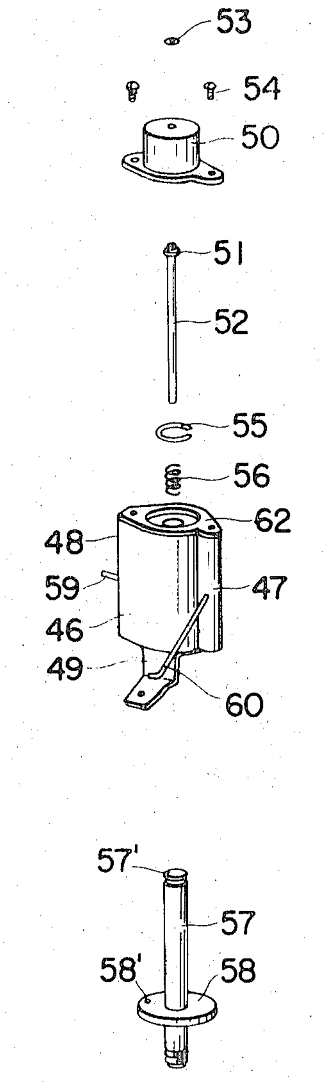
Figure 15B:
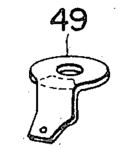
Figure 15C:
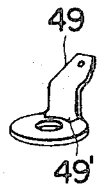

FIGS. 8*a*, 8*b*, 8*c* and 8*d* show an embodiment of a tape cartridge employed in the apparatus of the invention, wherein FIG. 8*a*, shows a longitudinal section, FIG. 8*b* a cross-sectional view, FIG. 8*c* a cross-sectional view with the tape being taken out from the cartridge in the position of FIG. 8*b*, and FIG. 8*d* a rear view of the cartridge;

FIGS. 9*a*, 9*b* and 9*c* show respectively an exploded perspective view of the tape cartridge shown in FIG. 8, a perspective view of the assembled tape cartridge, and a perspective view of the tape cartridge with a part broken away and the tape being taken out;

FIG. 10 is a perspective view showing the reel portion of the tape cartridge;

FIGS. 11*a* to 11*f* illustrate an embodiment of a tape cartridge loading mechanism used in the apparatus of the invention, wherein FIG. 11*a* shows a section of the mechanism with the tape cartridge being inserted, FIG. 11*b* a section of the mechanism with the tape cartridge being completely inserted, FIGS. 11*c* and 11*d* bottom views of the principal parts of FIGS. 11*a* and 11*b*, respectively, and FIGS. 11*e* and 11*f* side views of the principal part of the mechanism in the process of tape cartridge insertion;

FIG. 12 is a perspective view for explaining the structure of the lock lever linkage of the loading mechanism;

FIG. 13 is a sectional view showing the position of the microswitch for the loading mechanism;

FIG. 14*a* and 14*b* illustrate in section an embodiment of a tape seek mechanism used with the apparatus of the present invention, wherein FIG. 14*a* shows the mechanism prior to its operation and FIG. 14*b* shows the mechanism after its operation;

FIGS. 15*a*, 15*b* and 15*c* illustrate respectively an exploded perspective view of a tape post actuated by the tape seek mechanism of FIG. 14, a perspective of the principal component of the tape post, and a reversed perspective view of the component shown in FIG. 15*b;*

Figure 16:
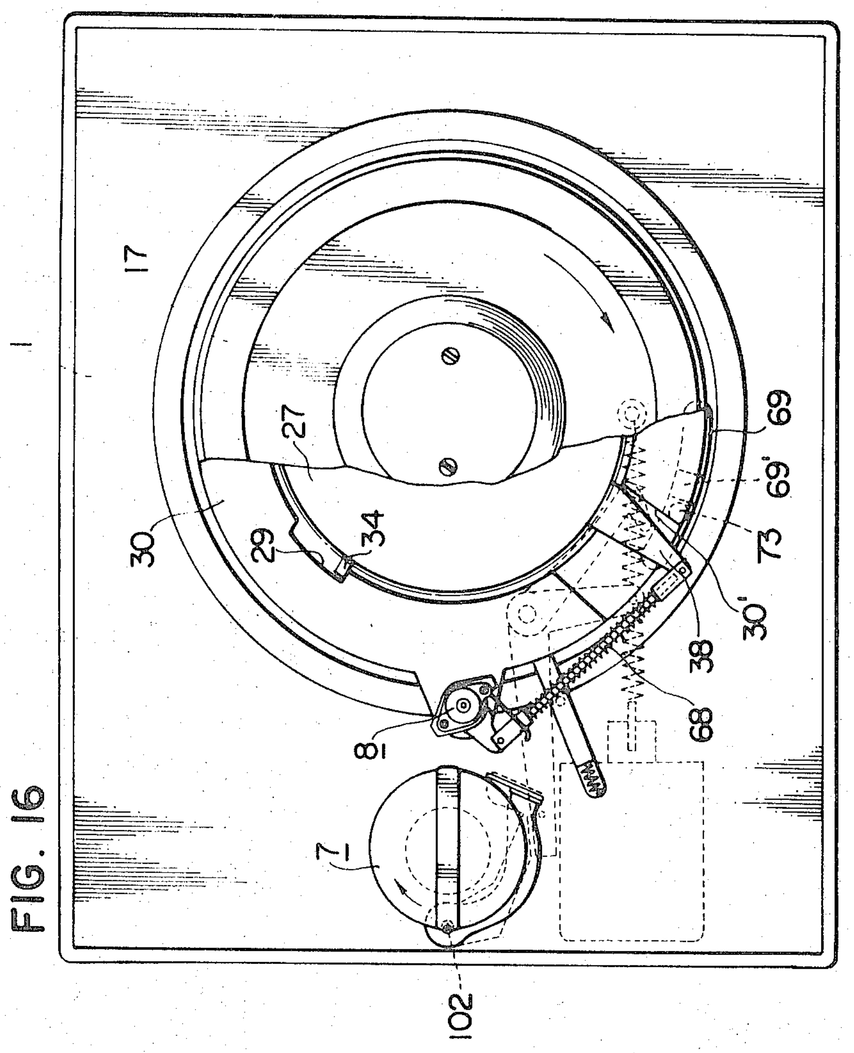
Figure 17:
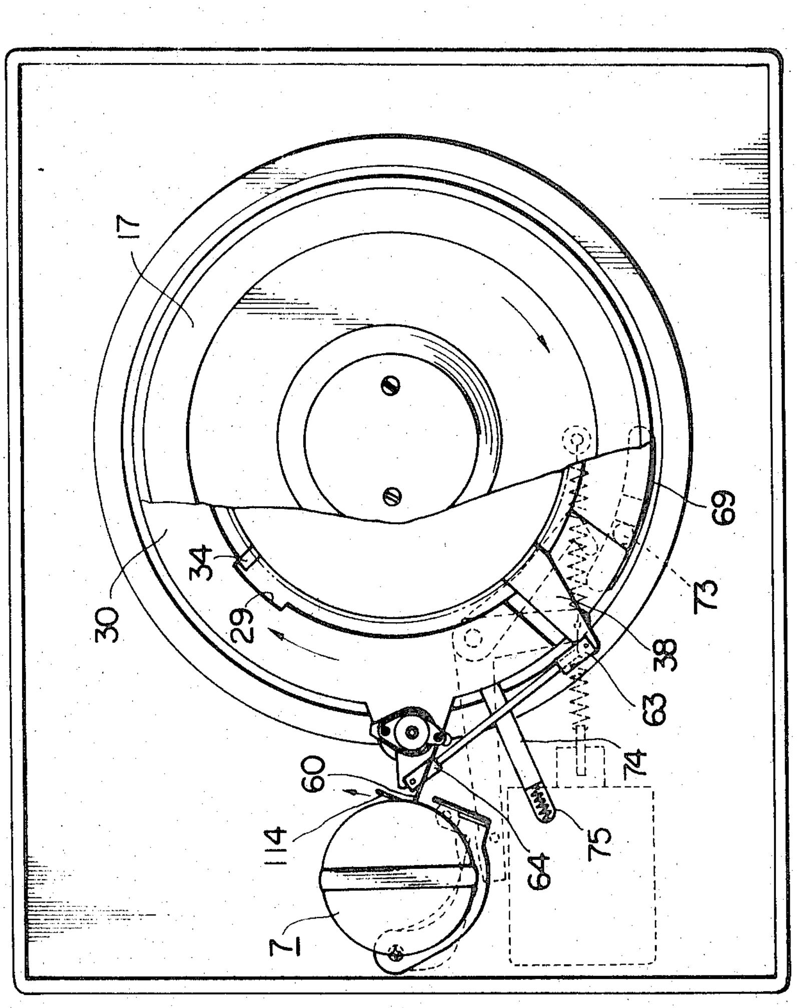
Figure 18:
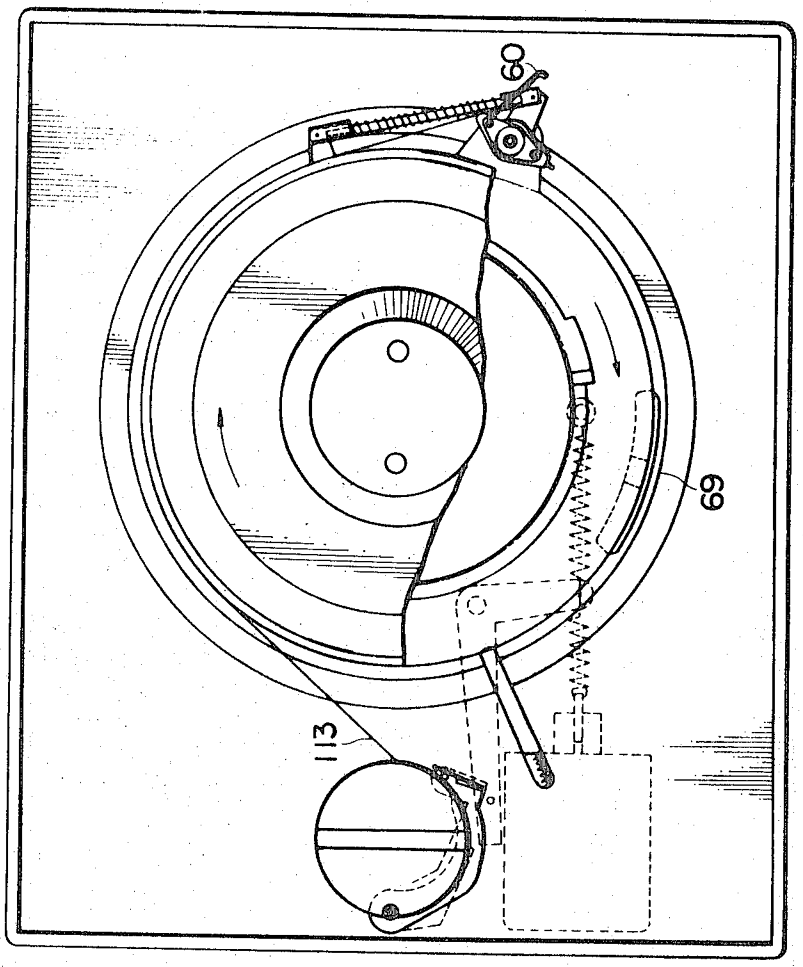
Figure 19:
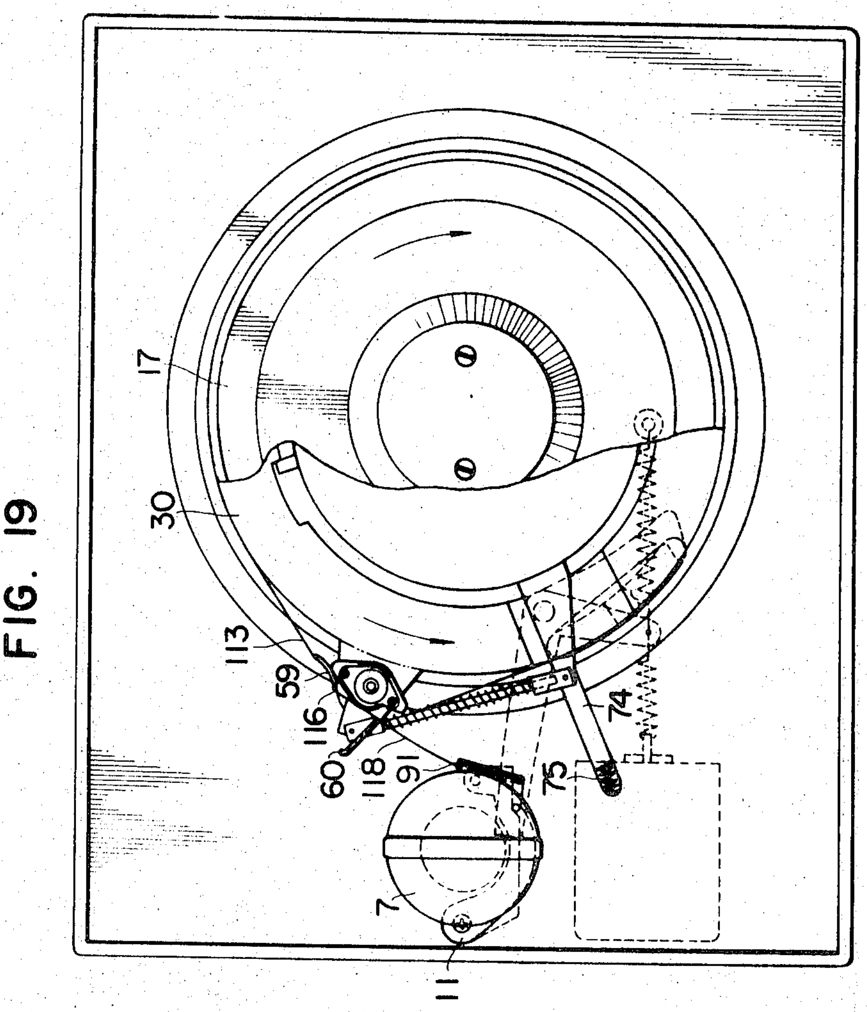
Figure 20:
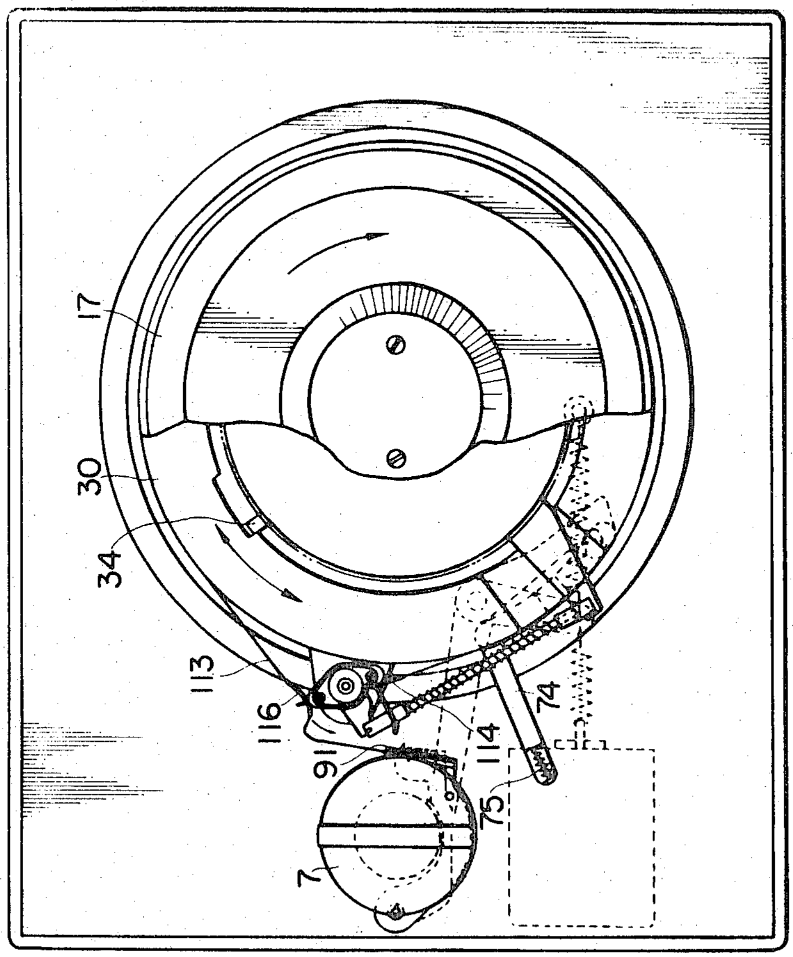
Figure 21:
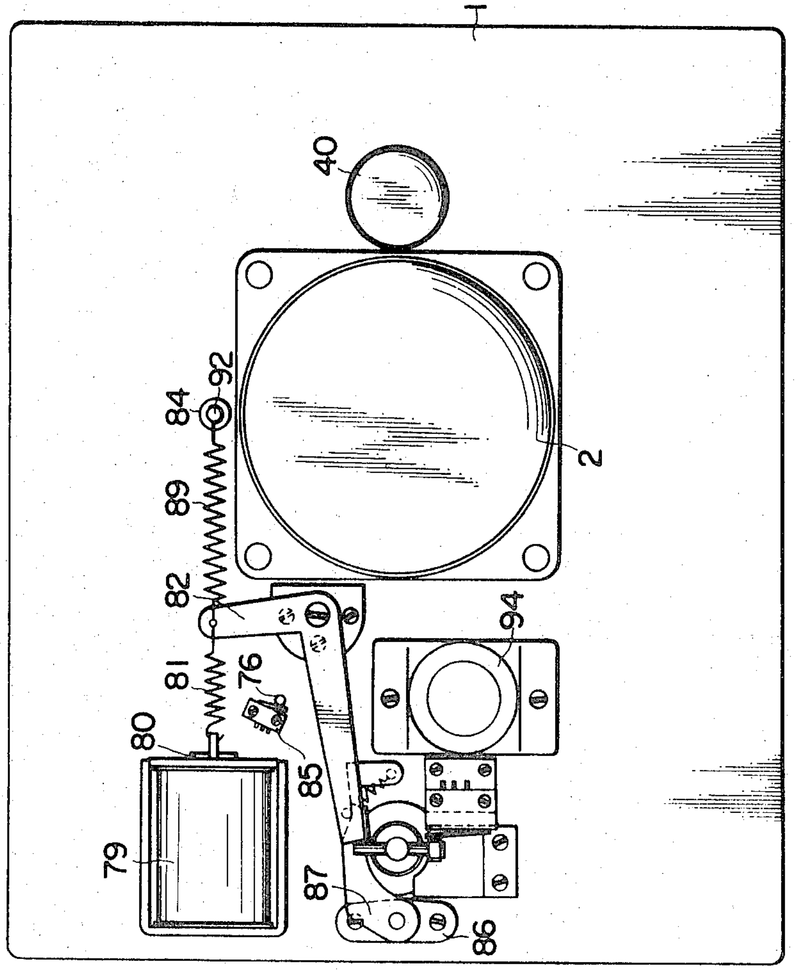
Figure 22:
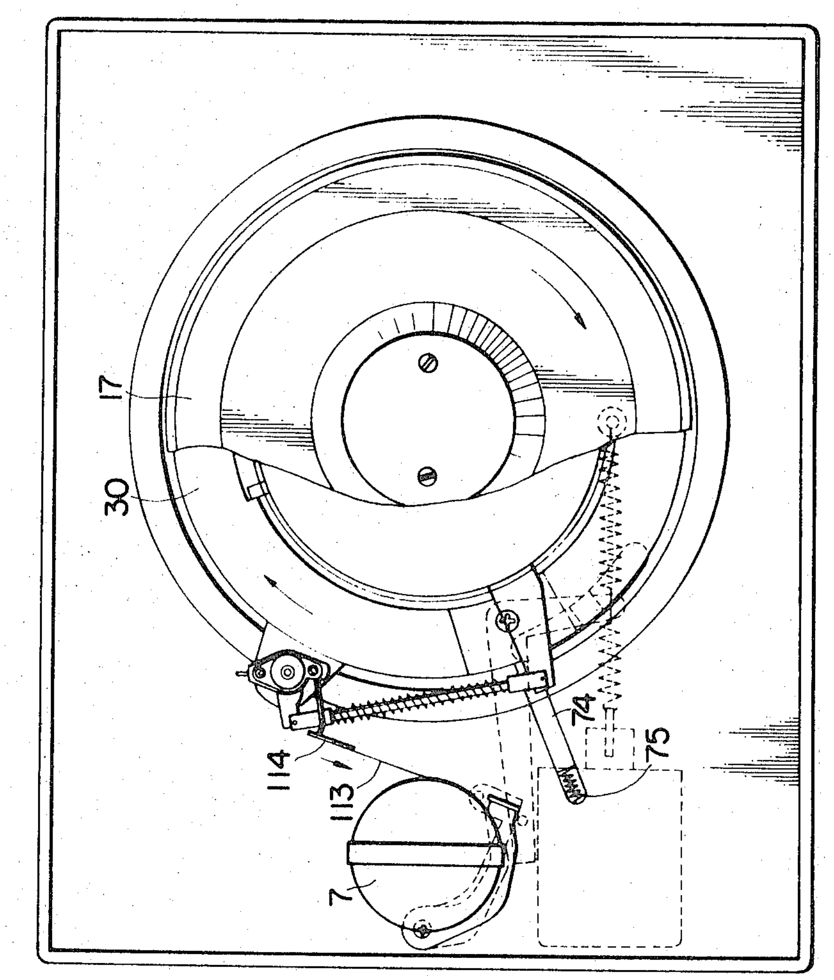
Figure 23:
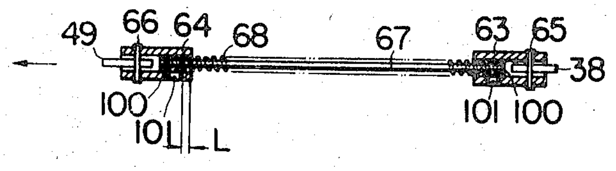
Figure 24A:
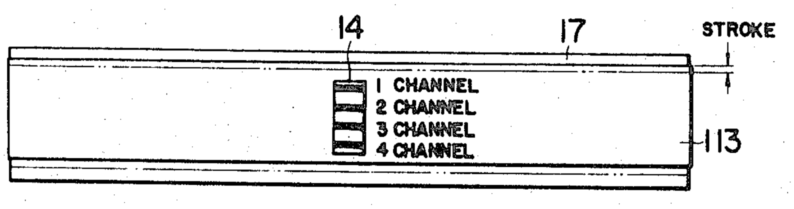
Figure 24B:
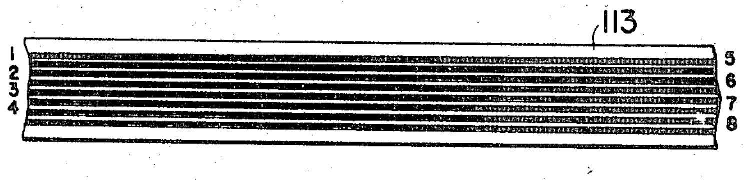
Figure 24C:
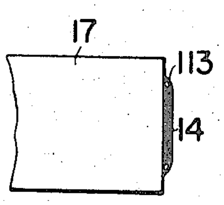
Figures 25, 27A, 27B, 28A, 28B:
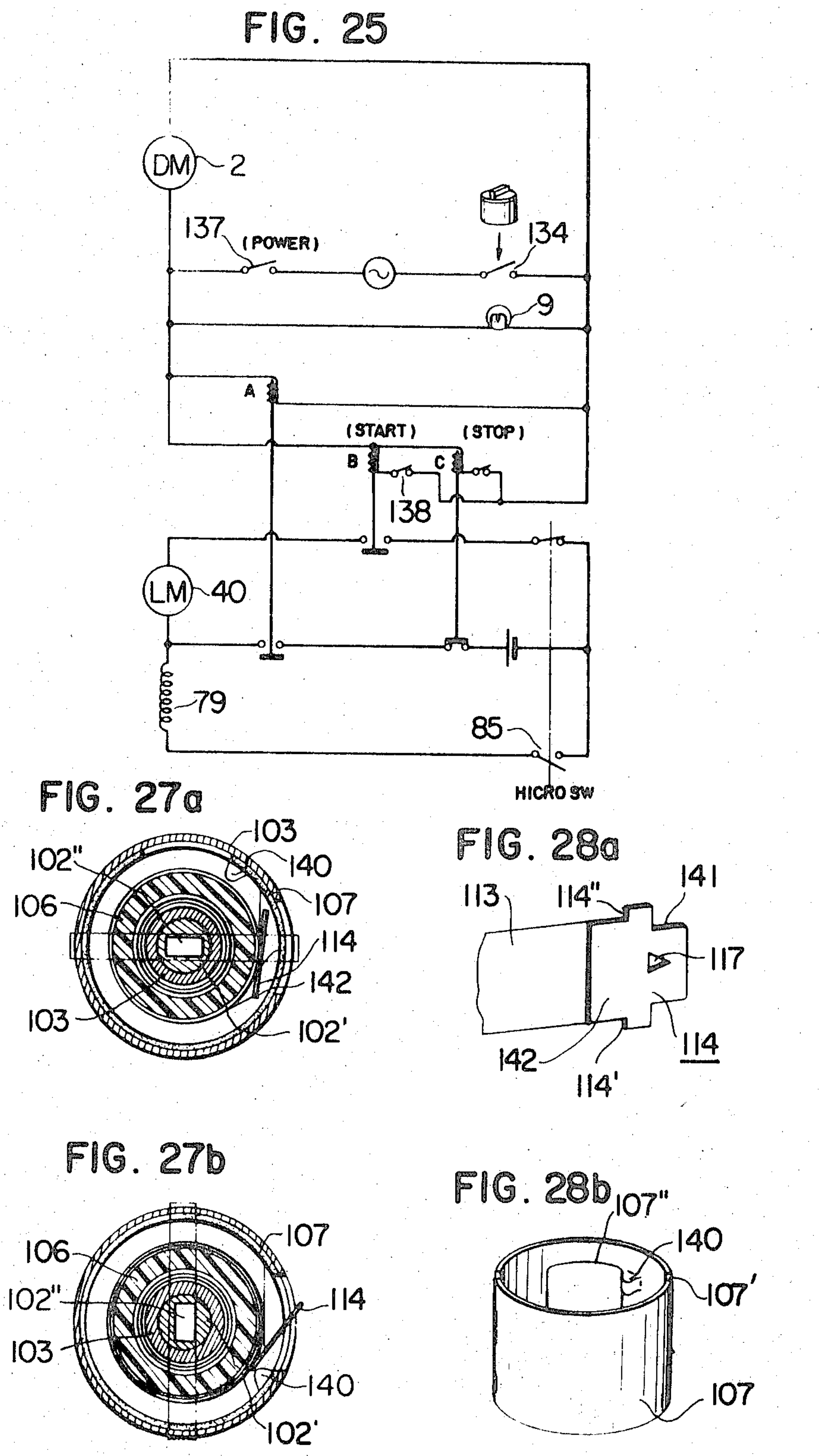
Figure 26:
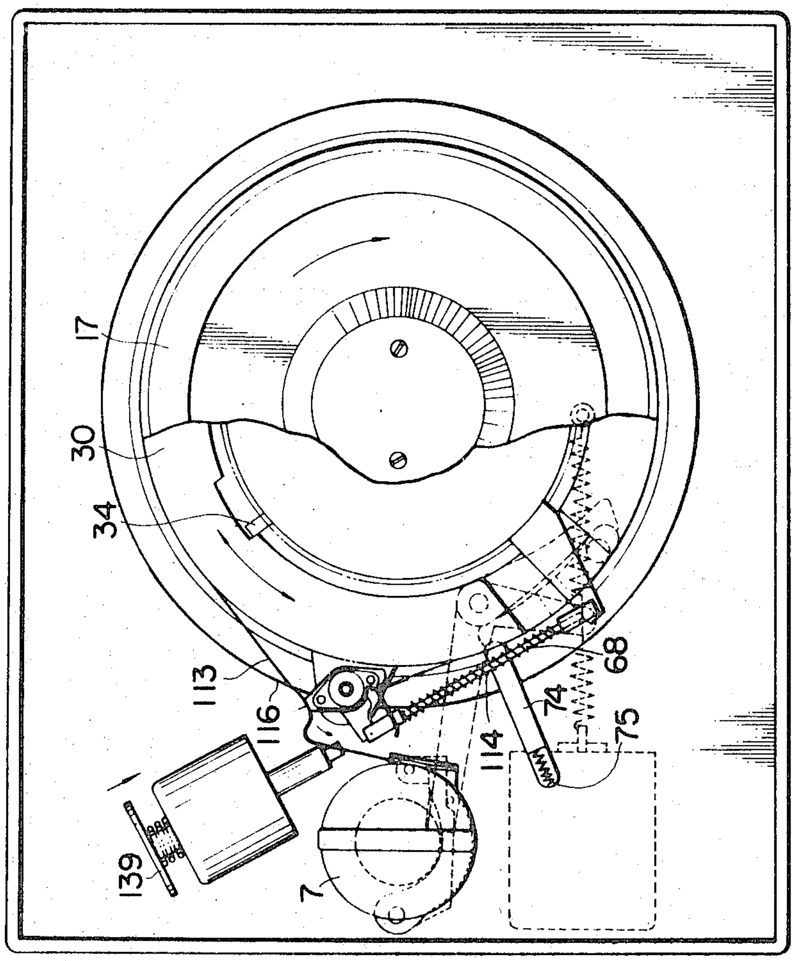

FIGS. 16 through 22 are diagrams for explaining the operation of the tape loading mechanism of the invention, wherein FIG. 16 is a plan view of the mechanism with the tape cartridge being inserted in the apparatus of the invention, FIG. 17 is a plan view of the mechanism with the tape cartridge completely inserted in the apparatus (tape loading start position), FIG. 18 is a view showing the mechanism during tape loading operation with a length of the tape being taken out from the tape cartridge and wound on the outer surface of the rotating drum, FIG. 19 shows the mechanism in a position just prior to the completion of the tape loading operation with the maximum length of the tape taken out from the tape cartridge, FIG. 20 shows the condition of the mechanism upon completion of the tape loading operation, FIG. 21 is a rear view of the apparatus of the invention in the condition of FIG. 20, and FIG. 22 is a plan view showing the condition of the mechanism when the tape loading was released in the condition of FIG. 20 to reaccomodate (rewind) the tape in the tape cartridge;

FIG. 23 is a detailed sectional view of a tape tension mechanism for applying a proper tension to the tape when the tape is wound around the outer surface of the rotating drum;

FIGS. 24*a*, 24*b* and 24*c* show respectively a tape seek stroke, the tape tracks obtained by the tape seek, and the relative positions of the drum, head and tape in the apparatus according to the first embodiment of the present invention;

FIG. 25 is an electric actuating circuit diagram of the first embodiment of the present invention;

FIG. 26 is a plan view of another embodiment of the present invention;

FIGS. 27*a* and 27*b* illustrate another embodiment of the tape cartridge used in the invention, wherein FIG. 27*a* shows a cross-sectional view and FIG. 27*b* a cross-sectional view with the tape being taken out in the condition shown in FIG. 27*a;*

Figure 29A:
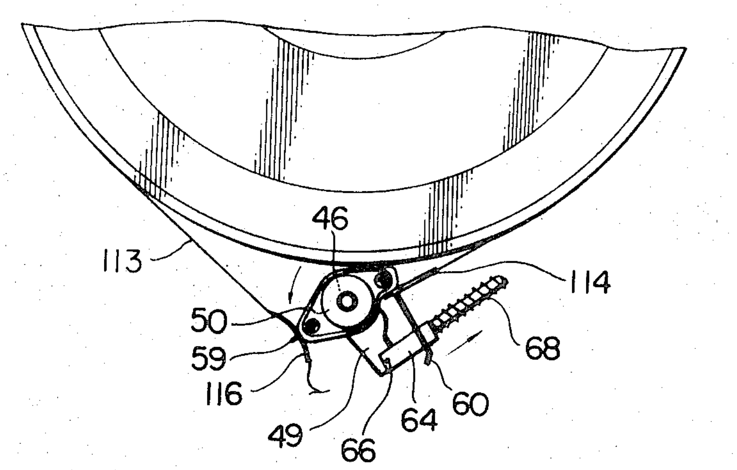
Figure 29B:
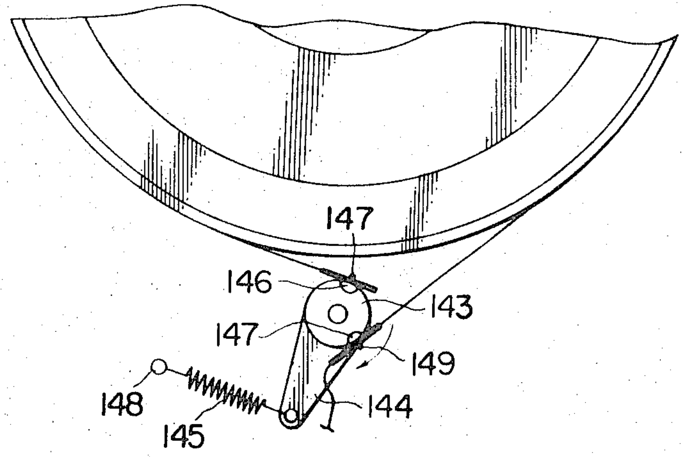

FIGS. 28*a* and 28*b* are perspective views of the principal parts of the tape cartridge shown in FIG. 27; and FIGS. 29*a* and 29*b* are top plan views showing respectively the tape post member used in the first embodiment and the tape post member of another embodiment of the present invention.

The preferred embodiments of the present invention will now be explained with reference to the accompanying drawings.

Figure 1:
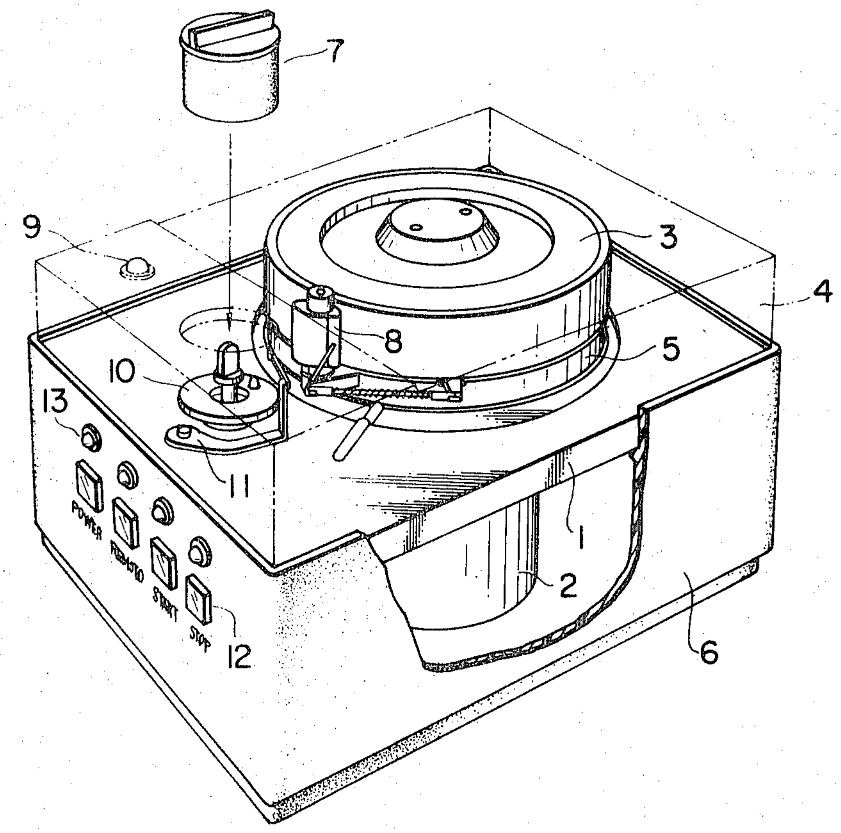
FIG. 1 is a perspective view illustrating diagrammatically a rotary head magnetic recording and reproducing apparatus according to an embodiment of the invention.

Referring first to FIG. 1 illustrating a diagramtic perspective view of an embodiment of the present invention, numeral 1 designates a base plate of the apparatus according to the present invention having at the center thereof an opening in which is securely mounted a motor 2 for driving a rotating drum unit 3. Numeral 4 designates a cover case made of a transparent plastic material or the like which is placed on the base plate 1 to cover the rotating drum unit 3 and other components. Numeral 5 designates a loading mechanism for loading a magnetic tape on the outer surface of the rotating drum 3. Numeral 6 designates a casing with a bottom plate which is located below the base plate 1 to enclose the motor 2 and other components. Numeral 7 designates a memory section of the apparatus consisting of a tape cartridge section in which a reel of magnetic tape of a fixed length is contained. Numeral 8 designates a tape holding post member for holding the magnetic tape in position after a length of the tape has been taken out from the tape cartridge 7 and wound on the outer surface of the rotating drum by the loading mechanism 5. The tape holding post member 8 is mounted on the loading mechanism 5. Numeral 9 designates a lamp adapted to be operated upon detection of the cartridge 7 having been securely placed in position on a cartridge deck 10 provided on the base plate 1, the lamp 9 being mounted on the cover case 4. Numeral 11 designates a tape stopper operating lever for a tape stopper which is disposed near the cartridge deck 10. Numeral 12 designates a plurality of pushbuttons including a button designated POWER which makes or breaks an electric circuit to the power source, a REMOTE pushbutton which will not be explained in any detail in the description of this embodiment, a START button for starting the operation of the loading mechanism, and a STOP button for releasing the operation of the loading mechanism.

In FIG. 1, the tape cartridge 7 is inserted as indicated by a dotted line. Numeral 13 designates a group of pilot lamps associated with the respective pushbuttons 12.

Figure 2:
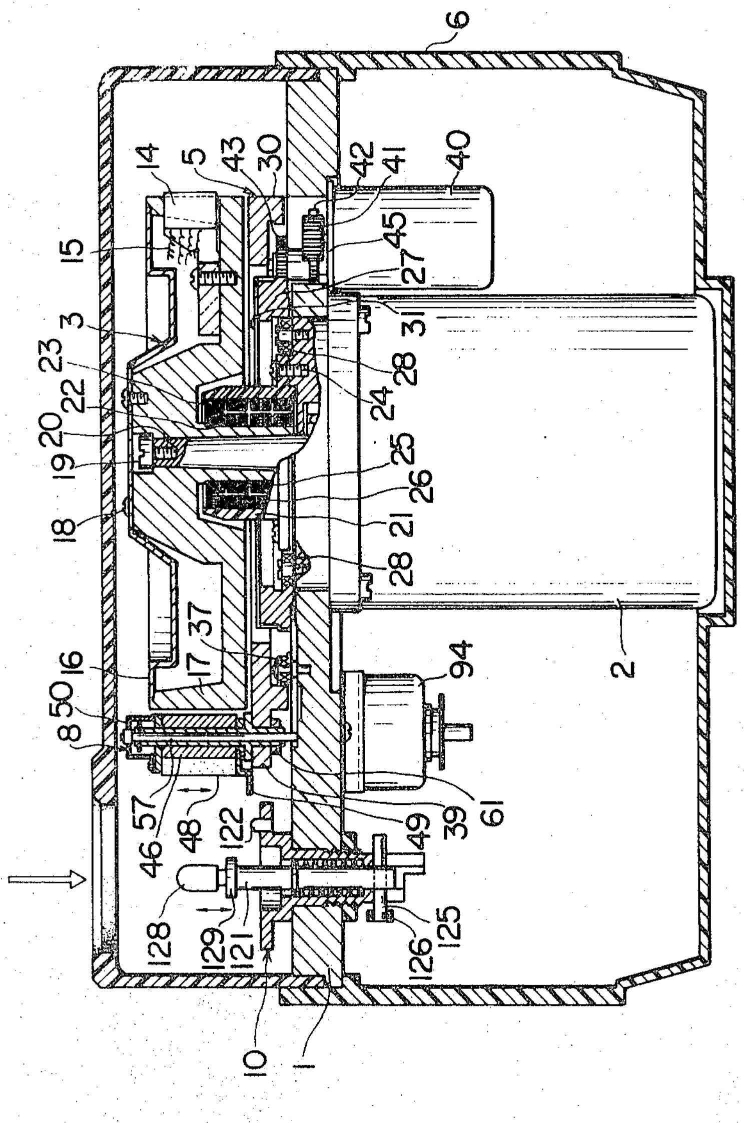
FIG. 2 is a sectional view of the principal part of FIG. 1.

Referring principally to FIG. 2, the rotating drum section 3 will be explained. In the figure, numeral 17 designates a rotating drum made of a material such as aluminum and in this embodiment the drum 17 consists of an aluminum drum having a hard chromium plating applied only on the outer surface thereof. Numeral 15 designates a head mounting block on which at least one head 14 (four heads in this embodiment) is securely mounted in the axial direction of the drum 17. The head mounting block 15 is attached to the drum 17 by means of a screw so that the fore end of the tip of the head 14 project slightly from the outer surface of the drum 17 through an opening formed on the peripheral portion of the drum 17 (for details, see FIG. 24*c*). Numeral 16 designates a cover plate enclosing the top of the drum 17 and the cover plate 16 is secured to the drum 17 by small screws 18. Numeral 20 designates a shaft member for the motor 2 consisting of a cone-shaped member on which the drum 17 is mounted and securely fastened by a screw 19. Below the drum 17, four rotor sections 22 of a rotary transformer corresponding to the respective heads 14 are successively slidingly mounted and secured closely together with a non-magnetic material 25 being inserted as a seat therebetween. Numeral 21 designates a stator housing in which stator sections 23 of the rotary transformer having a nonmagnetic material 26 inserted therebetween as a seat are provided in opposition to the previously described rotor sections 22 of the rotary transformer. The stator housing 21 is fastened to the motor 2 by screws 24 to become concentric with the shaft 20 of the motor 2. Numeral 27 designates a driving ring for the loading mechanism 5. The driving ring 27 is carried by three segmental flange bearings 28 (FIG. 7) divided at an angle of 120° and it is rotated concentrically with the motor 2. The thrust bearing for the driving ring 27 is provided by a Teflon sheet placed on the base plate 1. In this embodiment, the flange bearings 28 are inserted inside the driving ring 27 through a cutaway portion 33' shown in FIG. 7. Also provided inside the driving ring 27 is a spring 32 (FIG. 7) whose one end is secured to a pin 35 forcibly fit and secured onto the outer surface of the stator housing 21 and the other end is secured on one end of a pin 34 forcibly fit and secured in the radial direction of the driving ring 27 at a circumferential portion thereof. Therefore, when the driving ring 27 is rotated clockwise, the spring 32 is charged with a resilient force. Numeral 31 designates a cylindrical cover with a bottom plate which is placed on the driving ring 27 to enclose the spring 32. The driving ring 27 is also formed with a toothed wheel 44 (FIG. 7) on the outer surface thereof. Namely, as shown in FIG. 2, a motor base plate 45 supporting a loading motor 40 is mounted on the bottom of the base plate 1 so that a gear 42 constituting a reduction gear set and its cannon 43 are clearance-fit as a unit on a shaft mounted on the motor base plate 45. Accordingly, the rotational motion is transmitted from a pinion 41 of the loading motor 40 to the gear 42, the cannon 43 and the toothed wheel 44 of the driving ring 27, thereby rotating the driving ring 27 clockwise against the force of the spring 32. Numeral 30 designates another driving ring which is located just along the outer surface of the driving ring 27 as shown in FIG. 7. Similarly with the driving ring 27, the driving ring 30 is supported rotatably and concentrically with the motor shaft 20 by means of three segmental flange bearings 37 which are divided at an angle of 120° and which are adapted to control the downward movement of the driving ring 30 and two segmental flange bearings 36 which are divided at an angle of 180° and which are adapted to control the upward movement of the driving ring 30 by virtue of their flanges which are provided upwardly in contrast to those of the flange bearings 37. The flanged bearings 36 and 37 are mounted inside the driving ring 30 one at a time through a cutaway portion 33 shown in FIG. 7. Also, in this case, the flanged bearings 36 and 37 may be provided with an eccentric shaft so that the shafts may be rotated so as to be adjusted into concentricity with the motor 20 inside the driving ring 30. This equally applies to the previously described driving ring 27. As shown in FIG. 7, a cutaway portion 29 having a fixed circumferential length is provided inside the driving ring 30 to receive the other end of the pin 34 whose one end is used to fasten the spring 32. Consequently, the driving ring 27 is always urged counterclockwise by the biasing force of the spring 32 and thus the driving ring 30 is also urged counterclockwise. Further, a projecting pin 73 is provided on the back of the driving ring 30 to be positiond as shown by a dotted line in FIG. 6.

Figure 6:
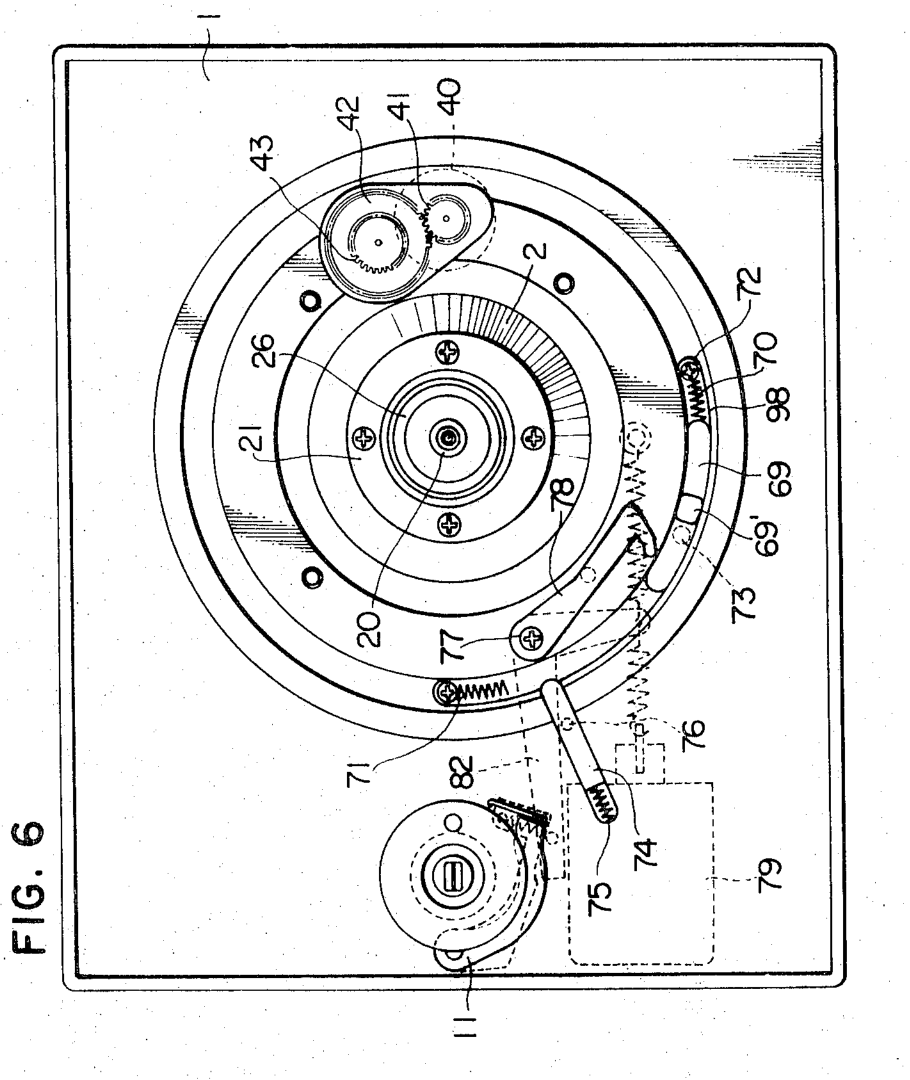
FIG. 6 is a plan view of FIG. 1 with the respective driving rings for the rotating drum and the loading mechanism being taken away.
Figure 7:
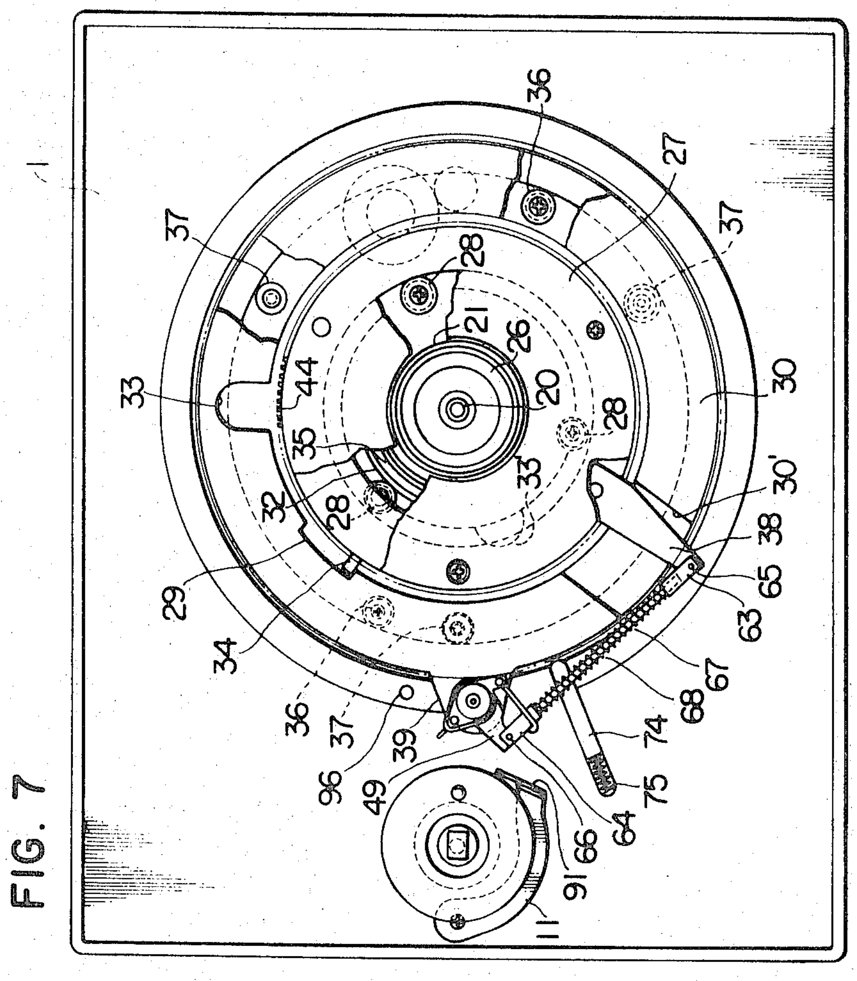
FIG. 7 is a plan view of FIG. 1 with the rotating drum and a part being taken and broken away, respectively.

On the other hand, as shown in FIG. 6, a plurality of grooves are formed concentrically with the motor 20 on the surface of the base plate 1. Numeral 98 designates one of these grooves and it extends about one third of the circumference. A slider 69 is fit in the groove 98 so that it is slidingly guided in the groove. The slider 69 is formed with a projection 69' at the center thereof. Buffer springs 70 and 71 are further secured onto the base plate 1 by screws 72 to absorb the shock of impact by the slider 69 at the final stage of its sliding movement in the groove 98.

With the arrangement as above described, the driving force of the spring 32 of the driving ring 27 is also imparted to the driving ring 30 by way of the pin 34, but this driving force normally brings about the positional relations as shown in FIGS. 6 and 7 by the engagement of the projection 69' of the slider 69 with the projecting pin 73 mounted on the back of the driving ring 30.

A tape holding post member 8 is mounted on a diametrically extending portion 39 formed on the outer periphery of the driving ring 30. Referring to FIG. 2 and FIG. 15 illustrating an exploded view of the tape holding post member 8, the post member 8 comprises a supporting rod 57 having a hole 57' through the center and a flange 58 at the lower part thereof and inserted in the opening formed in the extension 39 of the driving ring 30, and the supporting rod 57 is secured in place by a nut 61. A tape holding post body portion 46 is rotatably fit on the supporting rod 57. The body portion 46 includes two magnets (ferrite) 47 and 48 attached thereto and having secured thereon hook pins 59 and 60 for locking the ends of a tape. A ring 62 and a stopper cam plate 49 are fastened respectively at the thrust or axial ends of the tape holding post body portion 46. As shown in FIGS. 15*b* and 15*c*, the stopper cam plate 49 has formed on the back thereof a groove 49' to receive a stopper pin 58' provided on the flange 58, thereby controlling the stroke of movement of the tape holding post body portion 46. After the mounting of the tape holding post body portion 46 on the supporting rod 57, a compression spring 56 is inserted in place and then an E-ring retaining ring 55 is fit on the supporting rod 57. An operating rod 52 having an E-ring 51 fit on one end thereof is inserted in the through hole 57' so that the E-ring 51 acts as a stopper for the operating rod 52. A flanged cap 50 is then placed on the operating rod 52 and another E-ring 53 is fit on the rod 52 so that the operating rod 52 and the cap 50 are joined as a unit through the intermediary of the E-rings 51 and 53. The cap 50 is fastened by screws 54 to the ring 62 on the tape holding post body portion 46, bringing them together as a unit. With this construction, when the other end (lower end) of the operating rod 52 is urged against the returning force of the compression spring 56, the tape holding post body portion 46 is moved upward slidingly. This urging force is supplied by a tape seeking electromagnet 94 shown in FIG. 14*a*.

Figure 3:
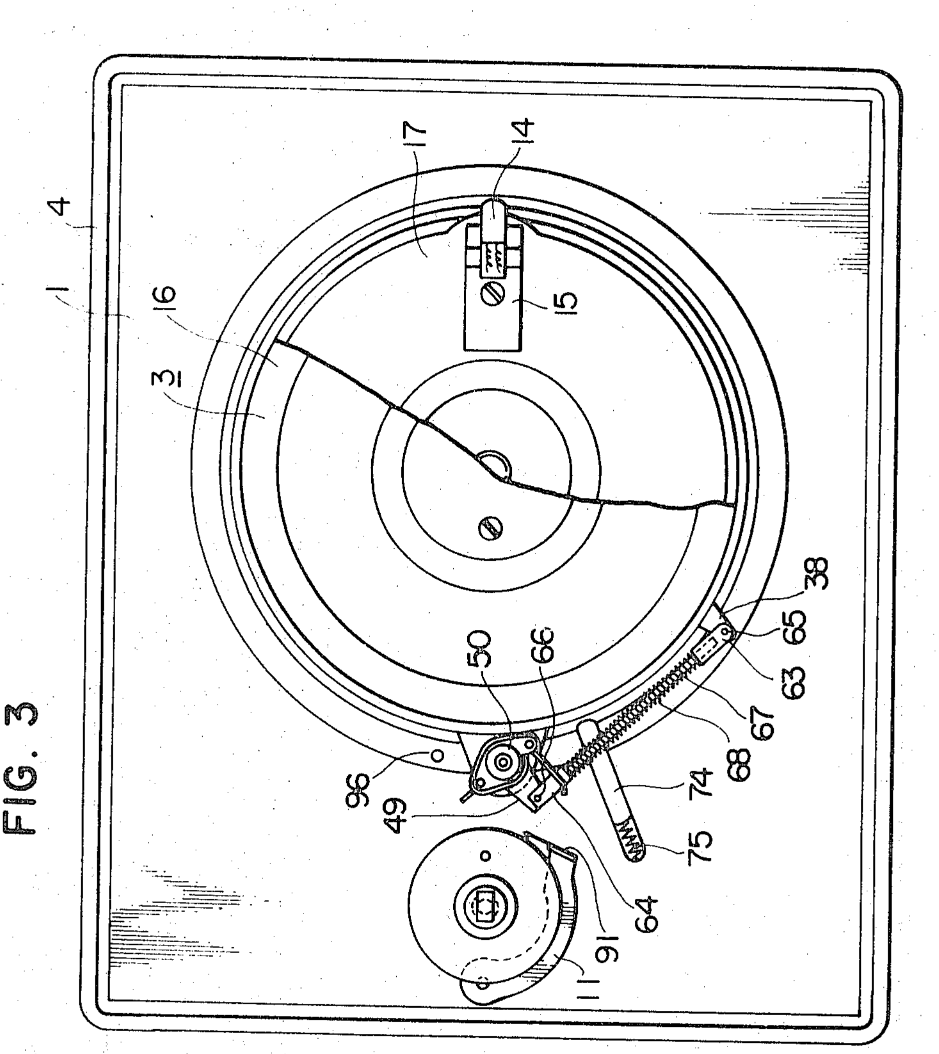
FIG. 3 is a plan view of FIG. 1 with a part broken away.

In other words, a stepped hole is formed through the base plate 1 to place a compression spring 97 in this hole and a flanged cap 96 is placed on a plunger 95 of the tape seeking electromagnet 94. As shown in FIG. 3, the cap 96 is positioned so that it is positioned to oppose the locus of movement of the operating rod 52.

Figure 4:
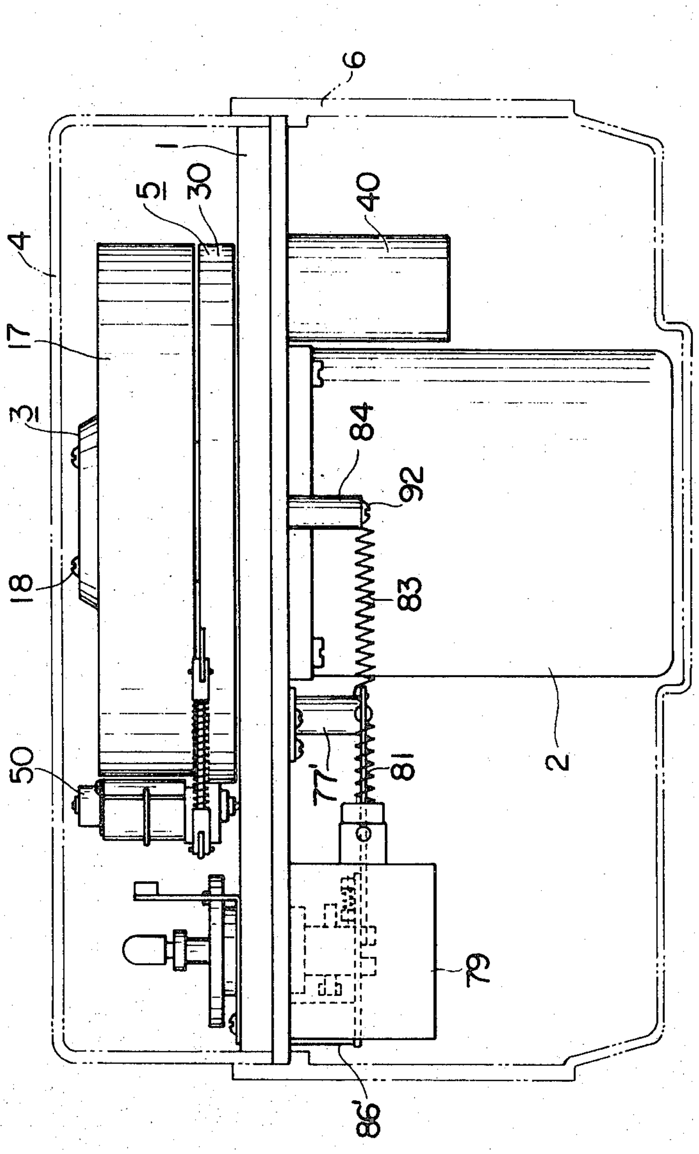
FIG. 4 is a side view of FIG. 1.
Figure 5:
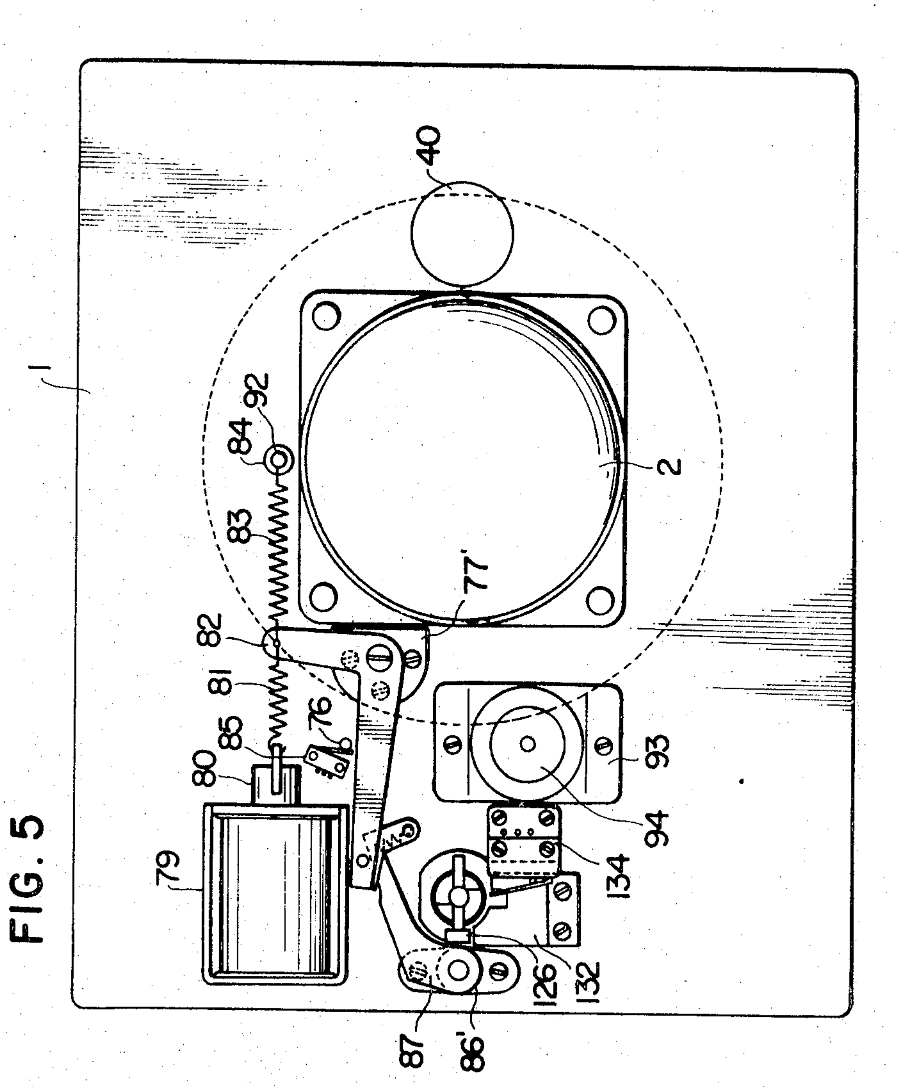
FIG. 5 is a rear view of FIG. 1.

The other end of the operating rod 52 comes into contact with the upper surface of the flanged cap 96 when the loading of tape is completed. Numeral 93 designates a mounting plate for attaching the tape seeking electromagnet 94 to the base plate 1. FIG. 14*b* shows the tape seeking electromagnet 94 in operating position with the operating rod 52 moved upward in the direction of an arrow. On the other hand, the sliding movement of the slider 69 in the groove 98 of the base plate 1 causes it to engage with another slider 74 which is slidably disposed in a groove connected to the groove 98 and formed to extend in a direction substantially perpendicular to the groove 98 and whose forward end normally projects slightly into the groove 98 from the side thereof. Consequently, as shown in FIG. 13, the slider 74 is moved against the force of a compression spring 75 in the radial direction of the motor 2 mounted on the base plate 1. As a result of this movement of the slider 74, a pin 76 securely fit into the slider 74 actuates a microswitch 85 mounted on the back of the base plate 1, causing an electromagnet 79 mounted on the back of the base plate 1 to perform its attracting action (See FIGS. 5, 6 and 12). A bearing 77' extending through the base plate 1 is secured to the base plate 1 by screws and a shaft 77 is rotatably fit in the bearing 77'. The shaft 77 is provided at its upper end with a lock lever 78 having an engaging pawl which engages the pin 73 mounted on the back of the driving ring 30. At the lower end of the shaft 77 is secured an L-shaped operating lever 82 having a pin 88 force fit and secured in the upper end thereof. At the end of the base plate 1 near the cartridge 7, there is a bearing 86' (FIG. 4) fastened by a screw and extending through the base plate 1 and a shaft 86 is rotatably mounted in the bearing 86'. The tape stopper operating lever 11 is mounted on the upper end of the shaft 86 and a tape stopper 91 having a U-shaped end is welded to the upper end of the lever 11. An operating lever 87 with the force-fit pin 89 is secured at the lower end of the shaft 86.

A tension spring 90 is fastened between the fixed pins 88 and 89. The fixed pin 88 provided on the operating lever 82 is normally urged against the side of the operating lever 87 by the force of the spring 90.

When the electromagnet 79 is energized so that the plunger 80 is attracted against the force of the return spring 83, the operating lever 82 is moved in the direction of an arrow (FIG. 12) through a buffer spring 81 and consequently the fixed pin 88 urges the operating lever 87 to rotate counterclockwise and at the same time rotates the tape stopper operating lever 11 counterclockwise. On the other hand, when the electromagnet 79 is deenergized, the operating lever 82 is returned to its initial position by the return spring 83 and both the operating lever 87 and the tape stopper operating lever 11 are returned to their respective initial positions by the tension spring 90.

Further, as shown in FIG. 7, a metal plate member 38 is secured on the driving ring 27, and one end of the plate member 38 extends to the outside of the driving ring 30 through its cutaway portion 30'. A hole is formed in the end of the plate member 38 so that when a pin 65 is fit in this hole, a cylindrical spring guide 63 formed with a groove to receive the end of the plate member 38 is rotatably carried on the plate member 38 with the pin 65 serving as a pivot. In like manner, a pin 66 is fit in a hole formed in the end of the stopper cam plate 49 to rotatably support a spring guide 64 on the stopper cam plate 49. A tension spring 68 having a bar 67 disposed therein is arranged between the opposed spring guides 63 and 64 and, as shown in FIG. 23, a sleeve 100 is inserted and fastened by a screw 101 at each end of the tension spring 68 to prevent it from bending inwardly.

When the stopper cam plate 49 is moved in the direction of an arrow, the tension spring 68 is stretched leaving a gap L between the sleeve 100 and the bar 67.

Next, the construction of the cartridge 7 will be described with reference to FIGS. 8 and 9.

In the figures, numeral 102 designates a knob of the tape cartridge which is formed at the lower portion thereof with a cylindrical guide 102' of reduced diameter and a rectangular hole 102'' with a bottom is formed within the guide 102'. The upper flanged portion of the knob 102 is provided with two diametrically extending protrusions 102''' which are made of a material such as delrin or nylon and are fit in notches 107' of a rotating ring 107 provided with a window 107'' at an outer surface thereof, so that the movement of the knob 102 is transmitted to the rotating ring 107. The circumferential sides of the window 107'' of the rotating ring 107 are arcuated to facilitate the movement of the rotating ring 107. Numeral 103 designates an outer case of the tape cartridge body portion which is also formed at an outer surface thereof with a window 103''' similar to the window 107'' and the rotating ring 107 is guided within the outer case 103 in contact with the inside thereof. Disposed inside the rotating ring 107 is a reel 106 activated to rotate by a coiled spring 111 (tape charge spring) and provided with upper and lower bearing members 112. The reel 106 is rotatably supported through the intermediary of the bearing members 112, with a hollow central tube member 103' of the outer case 103 serving as its shaft. One end of the coiled spring 111 is attached to a peg 106' provided on the inside of the reel 106 and the other end is attached to a peg 103'' of the outer case 103. Since notches must be provided on the sides in the thrust or axial direction of the reel 106 so that a beginning end metal piece 114 of magnetic material fastened to a magnetic tape 113 at the beginning of the tape may be inserted and guided through the notches, a notch is formed at 103''' on the bottom surface of the outer case 103 (FIG. 8) and at 105' of a side plate forcibly fit and secured at the upper end of the shaft portion of the outer case 103. Numeral 110 designates a snap ring for preventing the slip out of the knob 102 when it is rotatably inserted in the outer case 103. Numeral 108 designates a bottom plate of the cartridge 7 which is formed with a rectangular hole 108' at its center. The bottom plate 108 is also provided with another hole 109 at an off center position. The position of the hole 109 is in alignment with a bottomed hole 104 formed in the bottom of the outer case 103, and the bottom plate 108 is secured at the bottom of the outer case 103. A spacer 115 is placed between the knob 102 and the side plate 105 to ensure smooth rotational movement of the knob 102.

In FIG. 10, one end of the magnetic tape 113 is fastened on the outer surface of the reel 106 by an adhesive tape, for example, and a square hole 119 is formed at that end portion of the reel of magnetic tape first wound on the reel 106 so that the hole 119 engages with the tape stopper (FIG. 20). Another elongated square hole 118 is formed to provide a relief which receives the hook pin 60 of the tape holding post body portion 46 (FIG. 19). Numeral 116 designates a terminal end metal piece of a magnetic material having an arcuation of the same radius of curvature as the reel 106 so as to be wound thereon. Similarly with the beginning tape end metal piece 114 but in the opposite direction, a triangular hole 117 is formed at the center of the metal piece 114. During the process of tape loading, the metal piece 114 is engaged with the hook pin 60 and the metal piece 116 of magnetic material is engaged with the hook pin 59.

In other words, the reel 106 is activated by the spring 111 in a direction to take up the tape thereon and in this state the reel 106 is rotatably mounted on the central cylindrical member 103' of the outer case 103. The reel of magnetic tape 113 is normally accumulated on the reel 106.

Further, when the knob 102 is rotated to a position so that the window 107' of the rotating ring 107 adapted to rotate in association with the knob 102 aligns with the window 103''' of the outer case 103, as shown in FIG. 9, the beginning end metal 114 engaging the notches 103''' and 105' projects slightly from the window 103'' by the tensile force in the tape winding direction.

Referring now to FIG. 11, the cartridge loading mechanism will be explained. The cartridge 7 is inserted in the direction of an arrow through an opening 4' of the cover case 4 as shown in FIG. 11*a*. The deck for the cartridge 7 consists of a cartridge deck 120 having a force-fit pin 122 and the deck 120 is fit and fastened by a nut 124 in an opening formed in the base plate 1. The cartridge deck 120 is centrally formed with a bottomed opening and the lowermost portion of the opening is formed with a recess 127 and a supporting rod 121 for the cartridge 7 extends through the opening. One end 128 of the supporting rod 121 is rectangular in cross section and a portion 131 below the one end 128 has a circular cross section with a diameter which is larger than the minor side but smaller than the major side of a rectangular hole 108 in the bottom plate of the cartridge 7, while the succeeding portions constitute respectively a circular flanged portion 129 and a flanged portion 123 and a shaft 125 having a bearing 126 secured at one end is forcibly fit and secured at the lowermost portion of the supporting rod 121. A compression spring 130 is provided between the flanged portion 123 and the bottomed portion of the deck 120 so that the cartridge supporting rod 121 is normally urged upward and thus the shaft 125 is urged against the recess 127 of the cartridge deck 20, preventing the supporting rod 121 from extending from the cartridge deck 120.

With the construction so far described, if the rectangular hole formed in the bottom plate 108 of the tape cartridge 7 is fit and pressed downward on the upper end 128 of the supporting rod 121 and the cartridge knob 102 is rotated about 90°, the rotating ring 107 is moved and the movement of the outer case 103 is prevented by the pin 122. Consequently, the window 103''' of the outer case 103 is held in its position at that time and thus further movement of the knob 102 eventually brings the window 107'' of the rotating ring 107 in alignment with the window 103'''. As a result, the beginning end metal piece 114 which has been restrained by the inner wall of the rotating ring 107 is now allowed to project to the outside of the cartridge 7. This projecting force results from the fact that since the coil springs 111 (tape charge spring) in the cartridge 7 normally applies a tension which causes the tape to be always wound up on the reel 106, notch-cut portions 114' of the beginning tape end metal piece 114 are always forced against the side plate notch 105' and the outer case notch 103'''. Therefore, these abutting points serve as the supporting points of the metal piece 114 causing it to rotate and project to the outside of the cartridge 7. When the cartridge 7 is placed on the supporting rod 121 and simultaneously the knob 102 is moved about 90° while depressing it against the force of the compression spring 130 in the manner as above described, the bottom plate 108 is rotated with its rectangular hole positioned as shown in FIG. 8*c* relative to the supporting rod portion 131 of circular cross section. Consequently, upon completion of the movement of the knob 102, the cartridge 7 is securely held on the supporting rod 121 and at the same time the bearing 126 rotates gradually pressing a spring plate 132 until it eventially fits and settles in a recess 136. The spring force of the spring plate 132 exerts a downwardly acting force on the supporting rod 121 through the bearing 126 and consequently the cartridge 7 is snugly fit on the deck 120. On the other hand, upon completion of the rotation of the knob 102, the bearing 126 presses a lever 135 of a microswitch 134 mounted on a mounting plate 133 attached to the base plate 1 and thus the fact that the cartridge 7 has been settled in place is detected.

Following the foregoing description of the construction, the operating procedure of the tape loading mechanism will be described with reference to FIGS. 16 through 22.

FIG. 16 shows the condition in which the tape cartridge 7 is inserted in the apparatus of the invention in a position as shown in FIG. 7. When the knob 102 of the cartridge 7 is manually rotated clockwise as shown in FIG. 16 with the bottom plate 108 of the cartridge 7 fit on the upper end 128 of the supporting rod 121, the cartridge 7 is fixed on the deck 120 and at the same time the beginning tape end metal piece 114 is projected to the outside of the cartridge 7 by the movement of the rotating ring 107. The microswitch 134 (FIG. 11) is also turned on by the depression of the lever 135 by the bearing 126. In this state, the depression of the POWER button energizes the motor 2 (See the actuating circuit of FIG. 25) so that the drum 17 starts rotating clockwise as shown in FIG. 16 at a high speed of 1,800 rpm., for example. When the speed of the drum 17 attains a predetermined revolution (i.e., a relative velocity necessary to float the magnetic tape 113 from the outer surface of the drum 17), this is detected for example by a separate head or photocell (not shown), thereby energizing the loading motor 40.

Prior to the loading of tape, the driving ring 27 is always urged counterclockwise by the force of the spring 32 contained therein and it is thus abutting against the driving ring 30 on the side of the groove 29 through the pin 34, also urging the driving ring 30 counterclockwise. This rotational force is suppressed by virtue of the fact that the projecting pin 73 is abutting against the projection 69' of the slider 69 slidably placed in the groove 98 formed in the upper surface of the base plate 1. In this state, therefore, the slider 69 slightly bends the buffer spring 70. When in this state the START button is depressed so that the loading motor 40 starts rotating, the driving force of the motor 40 is transmitted through the pinion 41, reduction gear 42 and cannon 43 to the toothed wheel 44 of the driving ring 27 and eventually the driving ring 27 is rotated clockwise. On the other hand, the tape holding post member 8 is pulled by the tape-tension tension spring 68 and its rotational movement is prevented by the engagement of the stopper cam plate 49 and the stopper pin 58' of the supporting rod 57. FIG. 17 shows the condition in which the cartridge 7 has been completely fixed on the deck 120 with the beginning tape end metal piece 114 projecting to the outside of the cartridge 7. Also, the pin 34 of the driving ring 27 is moved through the groove 29 of the driving ring 30 to be pressed against the other side.

When the driving ring 27 is moved slightly in the manner described above, the spring guide 63 mounted on the plate member 38 with the pin 65 as its pivot is moved so that the edge portion of the bar 67 in the tension spring 68 is urged (in this case, the value of L shown in FIG. 23 become zero) and the tape holding post member 8 is rotated clockwise by the supporting rod 57 through the other spring guide 64. Consequently, the hook pin 60 provided on the tape holding post member 8 and having a hooked end is fit and engaged with the triangular hole 117 of the beginning tape end metal piece 114. In FIG. 18, the driving ring 27 has made a further movement from the position of FIG. 17.

During the transition from the condition shown in FIG. 17 to that shown in FIG 18, the projecting pin 73 of the driving ring 30 disengages the projection 69' of the slider 69 and the distance therebetween gradually increases. The tape 113 in the cartridge 7 is wound on the outer surface of the drum 17 against the force of the tape charge spring 111 in the cartridge 7 in the manner shown in FIG. 18.

As the transition occurs from the condition of FIG. 18 to that shown in FIG. 19, i.e., when the driving ring 30 makes one complete revolution, the projecting pin 73 of the driving ring 30 again comes into engagement with the projection 69' of the slider 69. Consequently, when the slider 69 slides further in the groove 98 formed in the upper surface of the base plate 1 and strikes the other buffer spring 71, the other slider 74 is urged by the slider 69 against the force of the spring 75 to move a pin 76. As a result, the microswitch 85 is turned on causing the electromagnet 79 mounted on the back of the base plate 1 to perform its attracting action and thus the operating lever 82 is moved by the buffer spring 81 against the return spring 83 (FIG. 21). Consequently, the lock lever 78 and the tape stopper operating lever 11 on the base plate 1 are rotated. On the other hand, the microswitch 85 is turned on by the slider 74 to deenergize the loading motor 40. In FIG. 19, both levers 78 and 11 are in operation. In this condition, the other hook pin 59 of the tape holding post 8 comes into contact with the triangular hole 117 of the terminal end metal piece 116 having the same radius of curvature as the reel 106 of the cartridge 7. The hook pin 60 is also inserted in the rectangular hole 118 formed in the tape of the cartridge 7, and the tape stopper operating lever 11 with the hooked locking piece 91 is fit in the square hole 119 at the end of the reel of tape on the reel 106.

Since the loading motor 40 is disconnected from the power source in the above-described situation, the driving ring 27 is reversed to rotate counterclockwise by the force of the spring 32 contained in the driving ring 27 and the driving ring 30 is also rotated counterclockwise by the pin 34 and the groove 29. Consequently, at a point where the driving rings 27 and 30 have been rotated in the reverse direction to some extent, the projecting pin 73 of the driving ring 30 is stopped by the lock lever 78. In this case, the tape 113 is also rewound slightly back into the cartridge 7 to a point where the hooked locking piece 91 catches the square hole portion 119 so that the length of tape preceeding the square hole 119 is slightly slackened (while, in this embodiment, the tape has been slackened by the locking piece 91, the flanged portions of the reel 106 may be formed with ratchet teeth so that the ratchet wheel is engaged and locked). Simultaneously, the slight rotation of the driving ring 27 in the reverse direction causes the tape holding post member 8 to rotate counterclockwise through the spring guide 63 of the plate member 38, the tension spring 68 and the spring guide 64. As a result, the other hook pin 59 is locked in the triangular hole 117 of the terminal end metal piece 116 and they are, along with the hook pin 60 and the beginning end metal piece 114, attracted and held in place completely by the magnets (ferrite) 47 and 48 of the tape holding post member 8 (at this time, the magnetic faces of the magnets 47 and 48 are in parallel with the outer surface of the drum). In other words, as shown in FIG. 20, the loading of the tape 113 on the outer surface of the rotating drum 17 is completed. Since the tape 113 is held by the hook pins 59 and 60 at the triangular holes 117 in the metal pieces 116 and 114, the repeatability of the tape support is positive and reliable even when the process of loading is started all over again several times.

Further, since the tape holding post member 8 is provided with the magnets 47 and 48 at the positions corresponding respectively to the metal pieces 114 and 116, the metal pieces 114 and 116 of magnetic material are attracted to the magnets 47 and 48 so that there is no gap between the base of the hook pins 59 and 60 and the associated metal pieces 114 and 116, always holding them in the same positions. Thus, the envelope of the tape 113 which is obtainable upon completion of loading operation is uniform and stable and moreover there is no possibility of the metal pieces 114 and 116 disengaging the hook pins 59 and 60 due to vibrations caused by the rotation of the rotating drum, for example. In FIG. 20, the length of the tape 113 between the beginning end metal piece 114 and the terminal end metal piece 116 is predetermined and therefore a predetermined tension is applied to the tape 113 by virtue of the force of extension of the tension spring 68 between the spring guides 63 and 64 tending to urge the tape holding post member 8 counterclockwise. (Though this counterclockwise movement slightly slackens the tape at the beginning of the reel, a tension is still applied to the tape owing to a large tension at the end of the reel.) In this state, the groove 49' of the stopper cam plate 49 is not in contact with the stopper pin 58'.

In FIG. 20, if the tape seeking electromagnet 94 is actuated in the manner as shown in FIG. 14, the tape 113 may be moved in the axial direction with respect to the outer surface of the rotating drum 17 owing to a slack in the portion of the magnetic tape 113 between the cartridge 7 and the electromagnet 94. In this case, a layer of air is formed between the tape 113 and the rotating drum 17 by the rotating drum 17 rotating at a high speed and thus it is possible to slide the tape 113 as desired. FIG. 24 illustrates tracks (5 – 8) which may be formed in this way. And access to any selected data track is at random either by the sliding of the type or the electronic switching of the head. In FIG. 20, a stream of air produced about the periphery of the rotating drum 17 by the rotation thereof floats the tape 113 wound on the drum periphery and data signals are recorded or reproduced from the tape 113 by the head 14 through the rotary transformer.

FIG. 22 shows a situation in which when the electromagnet 79 in the position shown in FIG. 20 is deenergized so that the levers 11 and 78 are returned to their initial position by the return spring 83, the driving ring 27 is rotated in the reverse direction by the force of the spring 32 along with the driving ring 30 and the tape is accumulated again in the cartridge 7 by the restoring force of the charge spring 111. At the end of the releasing process of tape loading, the condition shown in FIG. 16 results and the projecting pin 73 of the driving ring 30 strikes against the slider 69 and it is thus stopped under the influence of the damping action by the buffer spring 70. By turning the knob 102 of the cartridge 7 counterclockwise, the beginning tape end metal piece 114 is reaccommodated in the cartridge 7 and it is now ready to remove the cartridge 7 itself from the deck 120. During the process of tape loading release, the driving rings 27 and 30 are rotated in the reverse direction by the force of the spring 32 and hence their backward movement is rapid. It is thus possible to utilize the loading motor 40 as a generator to provide a braking action during the releasing operation.

While, in the embodiment so far described, a single four-channel multi-head has been used and a magnetic tape has been moved in two stages in the axial direction of a rotating drum to thereby provide a random access memory device having a total of 8 tracks, there is no need to mention that it is possible to utilize any other methods, such as, one in which a single-tip head may be used along with the intermittent feed of a stepping motor, for example, to move a tape in a number of stages to provide a plurality of tracks. In this case, however, it will be necessary to use a rotating drum having a greater axial dimension (the thickness in the axial direction) as compared with the one used in the above described embodiment. Further, while, in the described embodiment, the drum has been rotated in the same direction as the direction of tape loading, they need not necessarily be rotated in the same direction.

While, in the cartridge 7 described with reference to FIGS. 8 and 9, the forward end portion of a reel of tape is projected to the outside of the cartridge 7 since the rotational movement of the rotating ring 107 of the cartridge 7 causes the coil spring 111 to always apply a tension (tape winding force) to the tape causing it to be wound on the reel 106, other methods may also be utilized. For example, a tape of a considerable thickness may be used to utilize the resiliency of the tape itself so that when the tape is wound on the outer surface of the reel 106, the forward end portion of the reel of tape is projected to the outside of the cartridge 7 due to the force produced by the uncoiling tape. Further, it is possible to utilize the rotational action of the driving ring itself to cause the forward tape end portion to project from the cartridge.

Moreover, a magnetic shield structure which shuts out external magnetic fields may be provided by making the upper portion of the cartridge knob 102, outer case 103, cartridge bottom plate 108 and the enclosure of the cartridge with a suitable magnetic material.

While, in the embodiment described above, the tapes having the width of ½ inch, ¾ inch, 1 inch and so on have been used, any tapes greater than 1 inch or less than ½ inch in width may also be used as desired in accordance with the desired memory capacity.

FIG. 26 is another embodiment of the present invention. When the loading of tape is completed, the longitudinal edges of the tape contact the outer surface of the rotating drum due to the escape of an air stream and this causes damages to the tape. This embodiment differs from the first embodiment in that a tape tension apply electromagnet 139 is included to apply a strong tension to the tape wound around the drum only when a write or read instruction signal is received. Thus, only when the electromagnet 139 is energized so that a tip 139' of the electromagnet 139 contacts the tape holding post member 8 urging it to rotate, the write or read operation is performed. On the other hand, when a write or read stop signal is received, the electromagnet 139 is deenergized so that a weak tension due to the spring force of the spring 68 is applied to the tape. In this way, the time during which the tape edges remain in contact with the outer surface of the rotating drum is minimized to thereby ensure a longer tape life. In this embodiment, the spring force of the spring 68 is selected smaller than that used in the first embodiment.

FIGS. 27 and 28 show a modified form of the cartridge 7.

FIG. 27 illustrates a second embodiment of the cartridge 7 in which the forward end of the magnetic tape 113 is projected to the outside of the cartridge 7 and the rotating ring 107 has a slightly modified form. That is, a projection 140 is formed on the inner wall of the rotating ring 107. The beginning tape end metal piece 114 is also formed with a constricted portion at the tip thereof.

With the rotating ring 107 and the beginning end metal piece 114 modified slightly as above described, when the cartridge knob 102 is rotated about 90°, the projection 140 of the rotating ring 107 moves past the constricted portion 141 of the beginning tape end metal piece 114 accommodated within the cartridge 7, whereby the projection 140 depresses a rear metal piece portion 142 to project the metal piece 114 to the outside of the cartridge 7.

FIG. 29 illustrates the tape holding post member 8 (FIG. 29*a*) of the type used in the first embodiment of the invention and a tape holding post member (FIG. 29*b*) according to another embodiment.

The tape holding post member of FIG. 29*a* has been described in detail with reference to FIGS. 15 and 20. In other words, the tape holding post body portion 46 is urged counterclockwise by the tape tension spring to thereby apply a tension to the tape. Namely, the direction of movement is vertical to the tangential direction of the drum at the hook pin 60 of the tape holding post body portion 46, while the direction of movement is in the tangential direction of the drum at the hook pin 59 of the tape holding post body portion 46. In this way, the tape tension is applied. This arrangement thus has an advantage of facilitating the loading of tape on the outer surface of the drum.

FIG. 29*b* illustrates another arrangement for applying a tape tension in a manner different from that of the arrangement shown in FIG. 29*a*. A cylindrical tape holding post body portion 143 includes ferrite permanent magnets 146 and 147 securely mounted thereon and hook pins 147 and 149 securely mounted practically at the center of the magnets 146 and 147 similarly to those of the post body portion 46 to engage respectively with the beginning and terminal tape end metal pieces. To apply a tension to the tape, a tension spring 145 is provided whose one end is fastened to one end of an arm integral with the tape holding post 143 and the other end is fastened to the base plate. With this arrangement, in contrast to the arrangement of FIG. 29*a*, the tape holding post 143 is rotated clockwise, simultaneously producing a tape tension at each of the hook pins 147 and 149 of the tape holding post 143.

It will thus be seen that the present invention is carried out by accommodating a reel of magnetic tape in a cartridge so that, when necessary, the cartridge is inserted in the apparatus of the invention. The reel of magnetic tape is taken out and wound around the outer surface of a rotating drum by a tape holding post which engages the ends of the reel of magnetic tape. The rotation of the rotating drum produces a layer of air between the magnetic tape and the rotating drum, whereby the recording or reproduction of information is carried out while keeping the drum (head) out of contact with the tape. Further, if necessary, the magnetic tape is slidably moved in the axial direction of the drum to change the tracks. Thus, by using magnetic tape which is a simple form of recording medium and by accommodating a reel of magnetic tape in a cartridge thus making the changing of reels simpler, any desired information may be easily selected and extracted.

What we claim is:

1. A rotary head magnetic recording and reproducing apparatus comprising: a rotating drum having at least one magnetic head mounted about an outer surface of said rotating drum; drum driving means for operating said rotating drum at a high speed; a tape cartridge containing a reel of magnetic tape in such a manner that said magnetic tape can be taken in and out of said cartridge, said reel of magnetic tape having a first engaging means at the beginning thereof, the length of said magnetic tape being sufficient to substantially make a single winding around the outer surface of said rotating drum, the width of said rotary drum being greater than that of said magnetic tape; cartridge holding means arranged adjacent to said rotating drum for removably supporting said cartridge; a tape holding post having an engaging pawl for engaging said first engaging means of said magnetic tape in said cartridge mounted on said cartridge holding means; and tape holding post driving means for reversibly moving said tape holding post along the outer surface of said rotating drum, whereby signals are recorded on or reproduced from said magnetic tape wound around the outer surface of said rotating drum by said tape holding post while producing a layer of air between said magnetic tape and said rotating drum.

2. A rotary head magnetic recording and reproducing apparatus according to claim 1, further including means for moving said tape holding post, whereby said magnetic tape engaged with said tape holding post is moved in the axial direction of said rotating drum.

3. A rotary head magnetic recording and reproducing apparatus according to claim 1, wherein said reel of magnetic tape is provided with a second engaging means near the end of said reel, and said tape holding post is provided with a second engaging pawl, said second engaging pawl engaging said second engaging means when a single winding of said magnetic tape around said drum is completed.

4. A rotary head magnetic recording and reproducing apparatus according to claim 3, wherein said tape holding post is rotatably mounted on said tape holding post driving means.

5. A rotary head magnetic recording and reproducing apparatus according to claim 1, wherein said engaging means of said magnetic tapes and said tape holding post are made of magnetic material, and at least one of said engaging means and said tape holding post is magnetized.

6. A rotary head magnetic recording and reproducing apparatus according to claim 1, wherein said cartridge comprises a cylindrical outer case having an opening on a wall thereof, a rotating ring rotatably mounted in said outer case and having on a wall thereof an opening substantially equal to said opening of said outer casing, a reel rotatably mounted in said rotating ring, and means for urging said reel in a direction to take up said reel of magnetic tape wound on said reel.

* * * * *